United States Patent
Shiiyama

(10) Patent No.: US 7,124,308 B2
(45) Date of Patent: Oct. 17, 2006

(54) CONTROL OF REPRODUCTION APPARATUS AND DISTRIBUTION APPARATUS BASED ON REMAINING POWER OF BATTERY

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 10/454,706

(22) Filed: Jun. 4, 2003

(65) Prior Publication Data

US 2003/0229813 A1    Dec. 11, 2003

(30) Foreign Application Priority Data

Jun. 10, 2002 (JP) ............................. 2002-168810
Jul. 3, 2002 (JP) ............................. 2002-194564

(51) Int. Cl.
G06F 1/26 (2006.01)
G06F 1/32 (2006.01)
G06F 11/30 (2006.01)

(52) U.S. Cl. .................. 713/300; 713/320; 713/340
(58) Field of Classification Search ............ 713/300, 713/340
See application file for complete search history.

(56) References Cited

U.S. PATENT DOCUMENTS 6,947,181 B1 *  9/2005  Sato ........................... 358/400

2001/0027102 A1 * 10/2001  Okazaki et al. ............. 455/435
2002/0057769 A1 *  5/2002  Bhatoolaul et al. ........ 379/88.12

FOREIGN PATENT DOCUMENTS

| JP | 2000-235637 | 8/2000 |
|----|-------------|--------|
| JP | 2000-235638 | 8/2000 |

* cited by examiner

Primary Examiner—Lynne H. Browne
Assistant Examiner—Stefan Stoynov
(74) Attorney, Agent, or Firm—Cowan, Liebowitz & Latman, P.C.

(57) ABSTRACT

A reproduction apparatus comprising a communication unit adapted to receive digital data distributed by a distribution apparatus, a reproduction unit adapted to reproduce the digital data received by the communication unit, a prediction unit adapted to predict a reproducible time using remaining power of a battery before the reproduction apparatus requests the distribution apparatus to distribute the digital data, and a determination unit adapted to determine whether the digital data can be reproduced to the end or not based on the reproducible time predicted by the prediction unit. If the determination unit determines that the digital data can be reproduced to the end, the reproduction apparatus requests the distribution apparatus to distribute the digital data to be reproduced by the reproduction unit, and if the determination unit determines that the digital data cannot be reproduced to the end, the reproduction apparatus issues an alarm indicating that the digital data cannot be reproduced to the end.

9 Claims, 17 Drawing Sheets

CONTROL OF REPRODUCTION APPARATUS AND DISTRIBUTION APPARATUS BASED ON REMAINING POWER OF BATTERY

FIELD OF THE INVENTION

The present invention relates to a battery-driven distribution apparatus and a reproduction apparatus, and more particularly, to control over a distribution apparatus and a reproduction apparatus based on remaining power of a battery.

BACKGROUND OF THE INVENTION

There is a conventional battery-driven transmission apparatus that decides whether a data transmission function can be used or not based on remaining power of a battery and issues an alarm when it decides that data cannot be sent.

On the other hand, a music distribution system for battery-driven portable terminals is put to practical use. For example, there are a case where a portable terminal downloads MP3 music data, records it in a flash memory to listen to the music using a headphone and a case where latest melodies signaling an incoming call are downloaded to a cellular phone. Furthermore, a portable device such as a portable video player, portable audio player, notebook PC, PDA (Personal Digital Assistant), etc., is driven by a battery and has the function of reproducing digital data such as video data, audio data from recording media. Such portable devices also check the remaining power of the battery and issue an alarm to users when the battery level is low.

However, such conventional battery-driven portable devices only display the remaining power of the battery and there are cases where distribution of data may be incomplete due to a shortage of the remaining power of the battery.

Furthermore, the above-described conventional power saving technology performs power saving processing but does not perform any special reproduction considering the remaining power of the battery and just turns off power when the battery is exhausted, and cannot decide before reproducing desired digital data whether the digital data can be reproduced to the end or not. Further, it cannot efficiently overview data when the battery level is low, either.

SUMMARY OF THE INVENTION

The present invention has been made in consideration of the above situation, and has as its object to allow reproduction processing in consideration of the remaining power of the battery.

It is another object of the present invention to allow efficient transmission/reception of data even when the remaining power of the battery is low.

According to the present invention, the foregoing object is attained by providing a reproduction apparatus that requests a distribution apparatus to distribute digital data selected by a user, comprising: a prediction unit that predicts a reproducible time using remaining power of a battery; and a determination unit that determines whether the digital data can be reproduced to the end or not based on the reproducible time, wherein when it is determined that the digital data cannot be reproduced to the end, an alarm is issued indicating that the digital data cannot be reproduced to the end.

According to the present invention, the foregoing object is also attained by providing a control method for a reproduction apparatus that requests a distribution apparatus to distribute digital data selected by a user, comprising: predicting a reproducible time using remaining power of a battery; determining whether the digital data can be reproduced to the end or not based on the reproducible time; and issuing an alarm indicating that the digital data cannot be reproduced to the end when it is determined that the digital data cannot be reproduced to the end.

Furthermore, the foregoing object is also attained by providing a distribution apparatus that distributes digital data selected by a user to a reproduction apparatus, comprising: a prediction unit that predicts a transmittable data size using remaining power of a battery; and a determination unit that determines whether the digital data can be distributed to the end or not based on the transmittable data size, wherein when it is determined that the digital data cannot be distributed to the end, an alarm is issued indicating that the digital data cannot be distributed to the end.

Further, the foregoing object is also attained by providing a control method for a distribution apparatus that distributes digital data selected by a user to a reproduction apparatus, comprising: predicting a transmittable data size using remaining power of a battery; determining whether the digital data can be distributed to the end or not based on the transmittable data size; and issuing an alarm indicating that the digital data cannot be distributed to the end when it is determined that the digital data cannot be distributed to the end.

Further, the foregoing object is also attained by providing a reception apparatus that requests a distribution apparatus to distribute digital data selected by a user, comprising: a prediction unit that predicts a receivable data size using remaining power of a battery; and a determination unit that determines whether the digital data can be received to the end or not based on the receivable data size, wherein when it is determined that the digital data cannot be received to the end, an alarm is issued indicating that the digital data cannot be received to the end.

Further, the foregoing object is also attained by providing a control method for a reception apparatus that requests a distribution apparatus to distribute digital data selected by a user, comprising: predicting a receivable data size using remaining power of a battery; deciding whether the digital data can be received to the end or not based on the receivable data size; and issuing an alarm indicating that the digital data cannot be received to the end when it is determined that the digital data cannot be received to the end.

The foregoing object is also attained by providing a reproduction apparatus, comprising: a communication unit adapted to receive digital data distributed by a distribution apparatus; a reproduction unit adapted to reproduce the digital data received by the communication unit; a prediction unit adapted to predict a reproducible time using remaining power of a battery before the reproduction apparatus requests the distribution apparatus to distribute the digital data; and a determination unit adapted to determine whether the digital data can be reproduced to the end or not based on the reproducible time predicted by the prediction unit, wherein if the determination unit determines that the digital data can be reproduced to the end, the reproduction apparatus requests the distribution apparatus to distribute the digital data to be reproduced by the reproduction unit, and wherein if the determination unit determines that the digital data cannot be reproduced to the end, the reproduction apparatus issues an alarm indicating that the digital data cannot be reproduced to the end.

The foregoing object is further attained by providing a method for controlling a reproduction apparatus which includes a communication unit adapted to receive digital data distributed by a distribution apparatus and a reproduction unit adapted to reproduce the digital data received by the communication unit, the method comprising: predicting a reproducible time using remaining power of a battery before the reproduction apparatus requests the distribution apparatus to distribute the digital data; determining whether the digital data can be reproduced to the end or not based on the reproducible time predicted in the predicting step; requesting the distribution apparatus to distribute the digital data to be reproduced by the reproduction unit if it is determined in the determining step that the digital data can be reproduced to the end; and issuing an alarm indicating that the digital data cannot be reproduced to the end if it is determined in the determining step that the digital data cannot be reproduced to the end.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
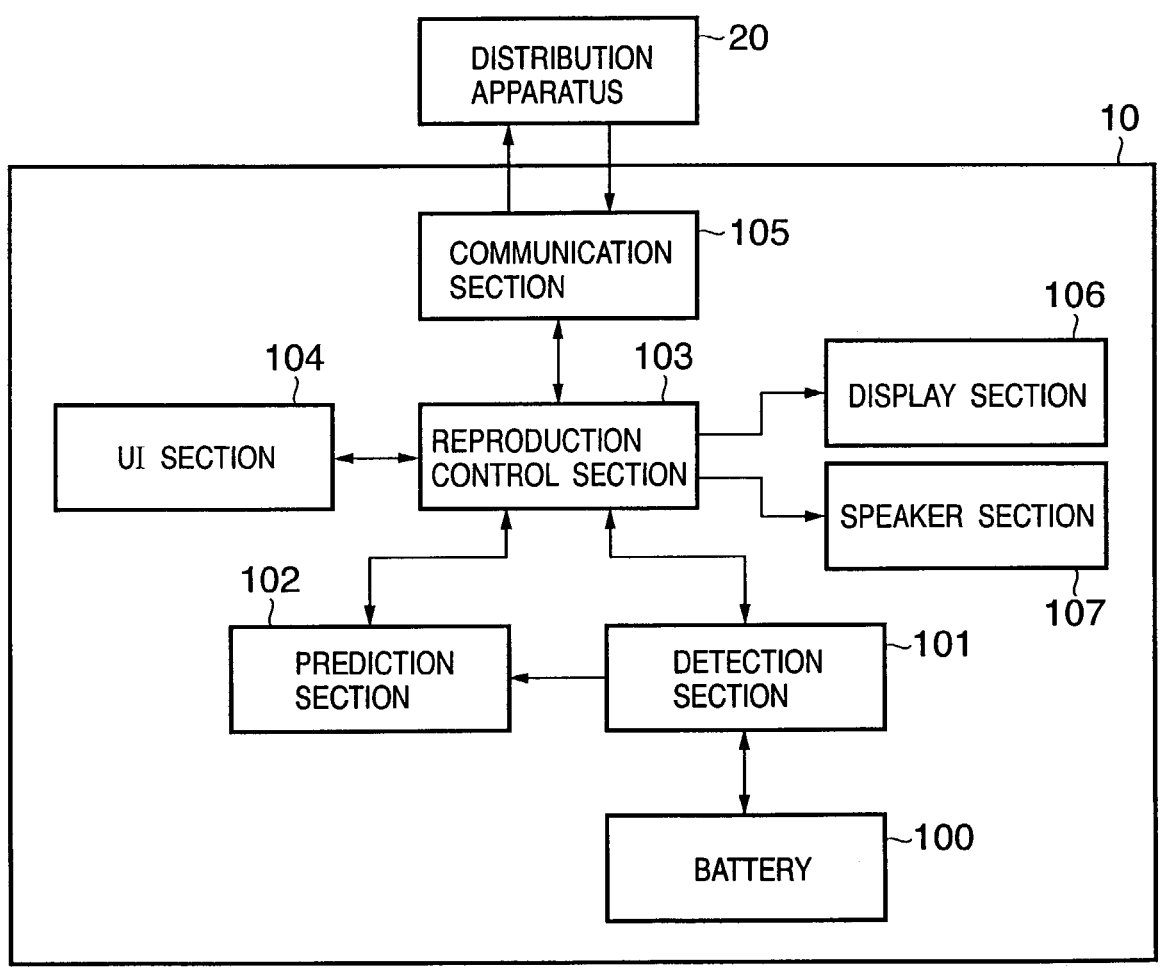
FIG. 1 is a block diagram showing a configuration example of a data distribution system according to first and second embodiments.
Figure 2:
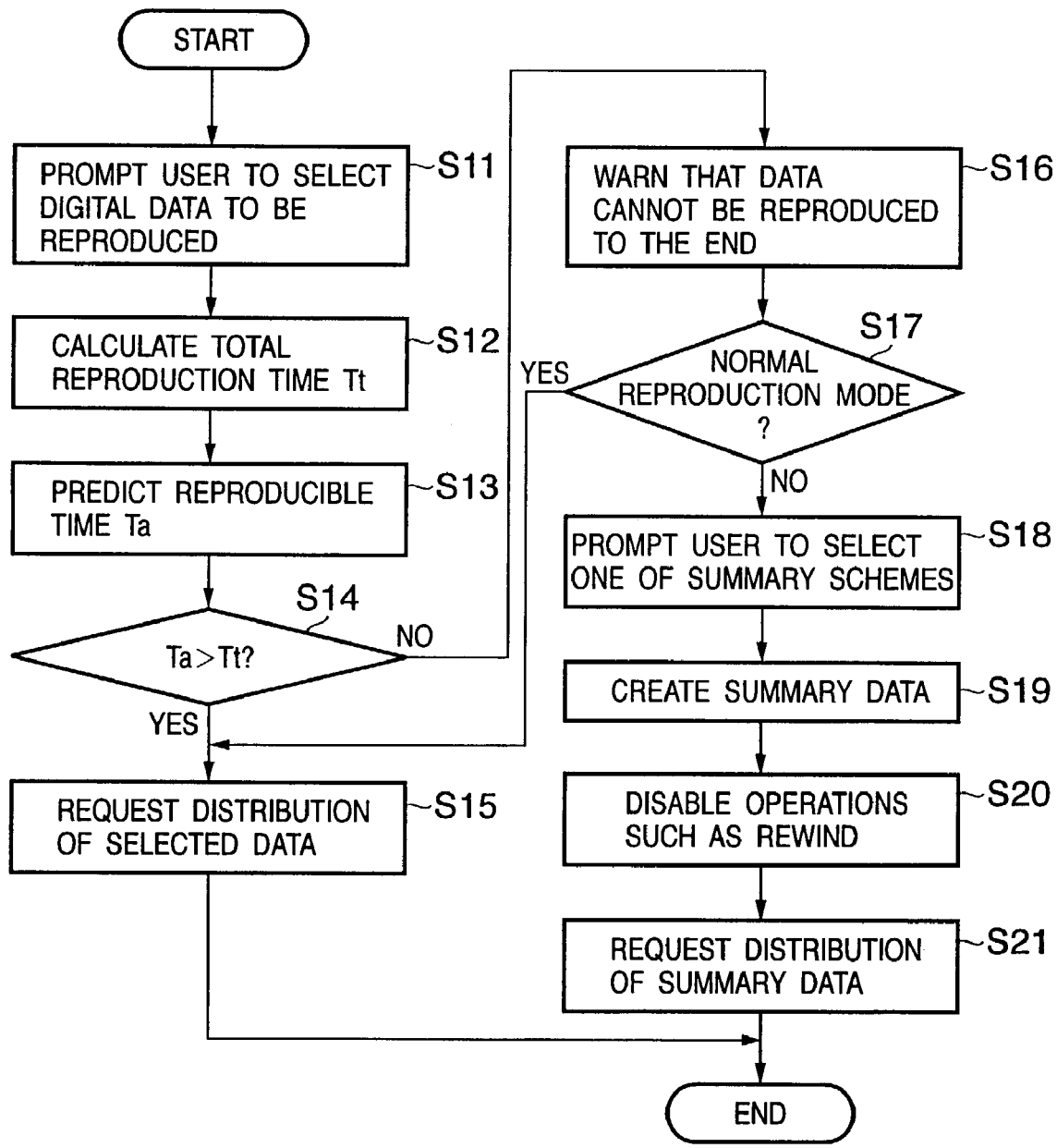
FIG. 2 is a flow chart showing a processing procedure of the data distribution system according to the first embodiment.

With reference to FIG. 1 and FIG. 2, a first embodiment of the present invention will be explained in detail below.

First, with reference to the block diagram in FIG. 1, a configuration example of the data distribution systems according to the first and second embodiments will be explained. The distribution apparatus 20 in FIG. 1 is a server having the function of distributing digital data selected by the user of a reproduction apparatus 10. Furthermore, the reproduction apparatus 10 in FIG. 1 is a portable device driven by a battery 100 and is a client having the function of receiving the digital data distributed from the distribution apparatus 20. The digital data distributed from the distribution apparatus 20 to the reproduction apparatus 10 may be video data, audio data, or video data with audio data.

As shown in FIG. 1, the reproduction apparatus 10 includes a battery 100, a detection section 101, a prediction section 102, a reproduction control section 103, a UI section 104, a communication section 105, a display section 106 and a speaker section 107.

The detection section 101 has the function of detecting the remaining power of the battery 100. The prediction section 102 has the function of predicting a reproducible time using the remaining power of the battery 100. The reproduction control section 103 has the function of reproducing the digital data distributed from the distribution apparatus 20. The user interface section (UI section) 104 has the function of notifying the reproduction control section 103 of the user's instructions. The communication section 105 has the function of receiving the digital data distributed from the distribution apparatus 20. The display section 106 displays video data in the digital data distributed from the distribution apparatus 20. The speaker section 107 outputs the audio data in the digital data distributed from the distribution apparatus 20.

Next, the processing procedure of the data distribution system according to the first embodiment will be explained with reference to the flow chart in FIG. 2.

In step S11, the UI section 104 prompts the user to select digital data to be reproduced. The reproduction control section 103 notifies the distribution apparatus 20 the user-selected digital data (hereinafter referred to as "selected data") via the communication section 105.

In step S12, the reproduction control section 103 calculates a total reproduction time Tt which is required to reproduce all the selected data.

In step S13, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S14, the reproduction control section 103 decides whether the current reproducible time Ta is longer than the total reproduction time Tt or not. This decision corresponds to a decision as to whether the selected data can be reproduced to the end or not.

When the current reproducible time Ta is longer than the total reproduction time Tt (YES in step S14), the selected data can be reproduced to the end. In this case, the process moves on to step S15 and the reproduction control section 103 requests the distribution apparatus 20 to distribute the selected data without creating any summary of the selected data and starts reproduction of the selected data. The communication section 105 receives the selected data distributed from the distribution apparatus 20 and supplies it to the reproduction control section 103. If video data is found in the selected data, the reproduction control section 103 processes it and supplies it to the display section 106 and if audio data is found in the selected data, the reproduction control section 103 processes it and supplies it to the speaker section 107.

On the other hand, if the current reproducible time Ta is not longer than the total reproduction time Tt (NO in step S14), the battery 100 will be exhausted during reproduction of the selected data, and therefore the selected data will not be reproduced to the end. In this case, the process moves on to step S16 and the reproduction control section 103 displays a message or icon on the display section 106 indicating that the selected data cannot be reproduced to the end and warns the user of it. At this time, the reproduction control section 103 can also display the total reproduction time Tt, reproducible time Ta and their difference on the display section 106.

In step S17, the UI section 104 prompts the user to select a normal reproduction mode or summary reproduction mode. When the user selects the normal reproduction mode (YES in step S17), the process in step S15 is executed. On the other hand, if the user selects the summary reproduction mode, the process in step S18 is executed.

In step S18, the UI section 104 prompts the user to select one of summary schemes. After the user selects one of the summary schemes, the reproduction control section 103 notifies the summary scheme selected by the user and the current reproducible time Ta to the distribution apparatus 20. Examples of summary schemes will be described later.

In step S19, the distribution apparatus 20 generates summary data which is a summary of the selected data based on the summary scheme selected by the user. At this time, the distribution apparatus 20 adjusts the total reproduction time of the summary data in such a way as to be shorter than the current reproducible time Ta of the reproduction apparatus 10. If the time taken to create the summary is long, the remaining power of the battery 100 drastically reduces, which may shorten the reproducible time. Thus, the reproduction apparatus 10 of this embodiment predicts the reproducible time Ta at predetermined intervals during summary data is created and notifies it to the distribution apparatus 20.

After the reproduction of the summary data is started, operations such as fast rewind, fast forward, and pause may reduce the remaining power of the battery 100 drastically, causing the battery 100 to be exhausted during the reproduction of the summary data. Therefore, the UI section 104 disables operations other than stop (fast rewind, fast forward, pause, etc.) in step S20. This function prevents the reproduction of the summary data from being interrupted midway.

In step S21, the reproduction control section 103 requests the distribution apparatus 20 to distribute the summary data and starts to reproduce the summary data. The communication section 105 receives the summary data distributed from the distribution apparatus 20 and supplies it to the reproduction control section 103. If video data is found in the summary data, the reproduction control section 103 processes it and supplies it to the display section 106 and if audio data is found in the summary data, the reproduction control section 103 processes it and supplies it to the speaker section 107.

As described above, the reproduction apparatus 10 according to the first embodiment can perform reproduction processing in consideration of the remaining power of the battery 100. Furthermore, when the remaining power of the battery 100 is too small for the user to reproduce the selected digital data to the end, the reproduction apparatus 10 according to the first embodiment can warn the user of it.

Next, the summary scheme that can be selected in step S18 will be explained.

(1) Summary Scheme 1

In this scheme, the reproduction control section 103 automatically generates summary data of the selected data.

(2) Summary Scheme 2

This scheme allows the user to select portions to be reproduced and gather the portions selected by the user to generate summary data of the selected data.

(3) Summary Scheme 3

In this scheme, the reproduction control section 103 automatically generates summary data of the selected data based on user preference information which is information on the user's preferences. As the user's preference information, it is possible to use information specified by the MPEG-7 standard.

(4) Summary Scheme 4

This scheme allows the user to select portions to be reproduced from among portions automatically selected by the reproduction control section 103 based on the user's preference information and gathers the portions selected by the user to generate summary data of the selected data.

Second Embodiment

Figure 3:
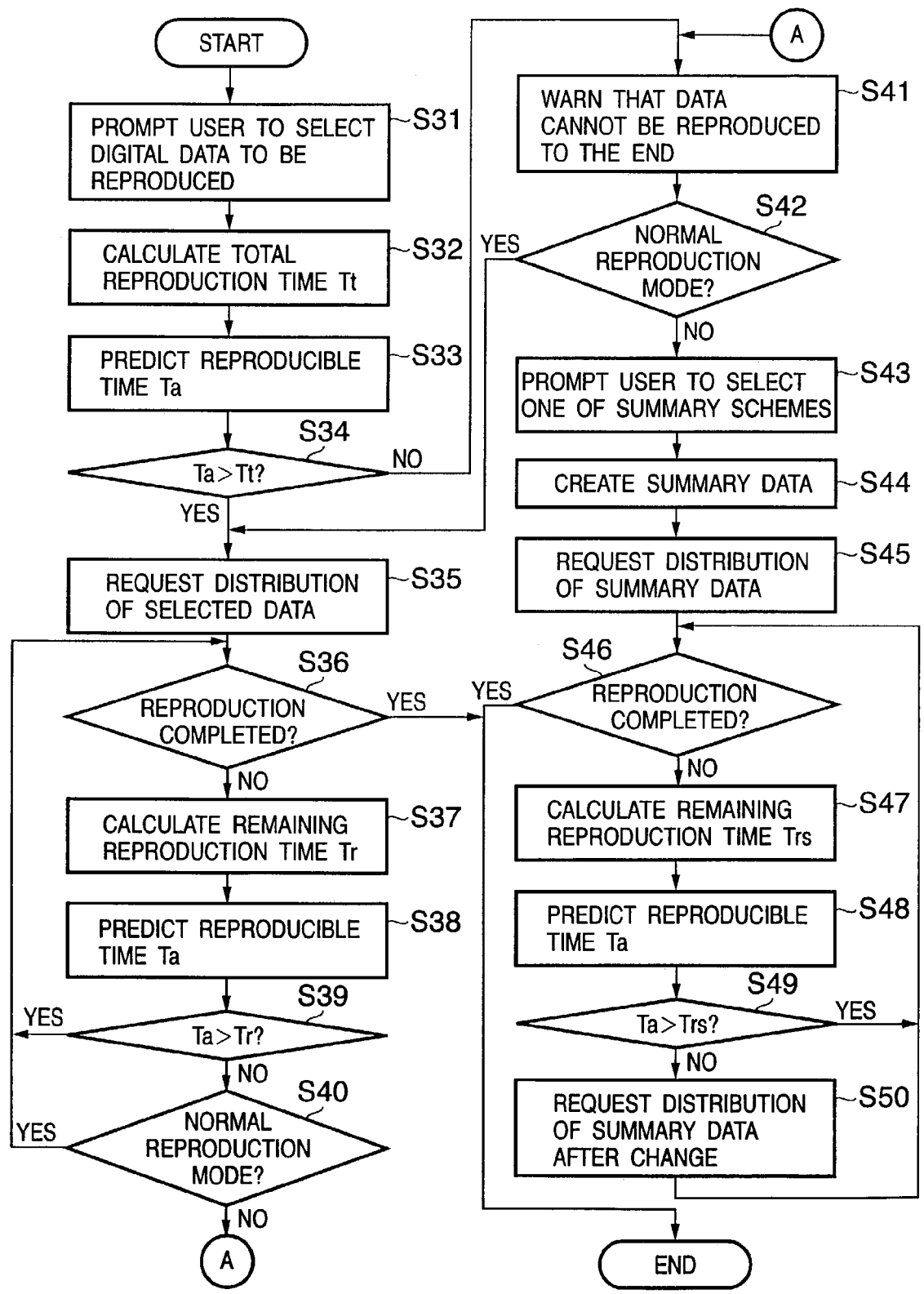
FIG. 3 is a flow chart showing a processing procedure of a data distribution system according to the second embodiment.

With reference to FIG. 1 and FIG. 3, a second embodiment of the present invention will be explained in detail below.

With reference to the flow chart in FIG. 3, a processing procedure of the data distribution system according to the second embodiment will be explained.

In step S31, the UI section 104 prompts the user to select digital data to be reproduced. The reproduction control section 103 notifies the distribution apparatus 20 of the digital data selected by the user (hereinafter referred to as "selected data") through the communication section 105.

In step S32, the reproduction control section 103 calculates a total reproduction time Tt which is a time required to reproduce all selected data.

In step S33, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S34, the reproduction control section 103 decides whether the current reproducible time Ta is longer than the total reproduction time Tt or not. This decision corresponds to a decision as to whether the selected data can be reproduced to the end or not.

When the current reproducible time Ta is longer than the total reproduction time Tt (YES in step S34), the selected data can be reproduced to the end. In this case, the process moves on to step S35 and the reproduction control section 103 requests the distribution apparatus 20 to distribute the selected data without creating any summary of the selected data and starts reproduction of the selected data. The communication section 105 receives the selected data distributed from the distribution apparatus 20 and supplies it to the reproduction control section 103. If video data is found in the selected data, the reproduction control section 103 processes it and supplies it to the display section 106 and if audio data is found in the selected data, the reproduction control section 103 processes it and supplies it to the speaker section 107.

In step S36, the reproduction control section 103 decides whether the reproduction of the selected data is completed or not.

If the reproduction of the selected data is not completed (NO in step S36), the process moves on to step S37 and the reproduction control section 103 calculates the remaining reproduction time Tr of the selected data.

In step S38, the reproduction control section 103 makes the detection section 101 redetect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S39, the reproduction control section 103 decides whether the current reproducible time Ta is longer than the remaining reproduction time Tr or not. This decision corresponds to a decision as to whether the selected data can be reproduced to the end or not. When the current reproducible time Ta is longer than the remaining reproduction time Tr (YES in step S39), the reproduction control section 103 makes the distribution apparatus 20 continue to distribute the selected data.

When the current reproducible time Ta is not longer than the remaining reproduction time Tr (NO in step S39), the selected data cannot be reproduced to the end. In this case, in step S40, the reproduction control section 103 decides whether the normal reproduction mode is selected or not. If the normal reproduction mode is selected (YES in step S40), the reproduction control section 103 makes the distribution apparatus 20 continue the distribution of the selected data without generating a summary of the selected data.

On the other hand, if the current reproducible time Ta is not longer than the total reproduction time Tt (NO in step S39) and if the normal reproduction mode is not selected (NO in step S40), the battery 100 will be exhausted during distribution of the selected data, and therefore the selected data will not be reproduced to the end. In this case, the process moves on to step S41, the reproduction control section 103 displays a message or icon on the display section 106 indicating that the selected data cannot be reproduced to the end and warns the user of it. At this time, the reproduction control section 103 can also display the total reproduction time Tt, reproducible time Ta and their difference on the display section 106.

In step S42, the UI section 104 prompts the user to select a normal reproduction mode or summary reproduction mode. When the user selects the normal reproduction mode (YES in step S42), the process in step S35 is executed. On the other hand, if the user selects the summary reproduction mode (NO in step 42), the process in step S43 is executed.

In step S43, the UI section 104 prompts the user to select one of summary schemes. It is possible to use, for example, the summary schemes 1 to 4 explained in the above-described first embodiment as the selectable summary scheme in step S43. After the user selects one of the summary schemes, the reproduction control section 103 notifies the summary scheme selected by the user and the current reproducible time Ta to the distribution apparatus 20.

In step S44, the distribution apparatus 20 generates summary data which is a summary of the selected data based on the summary scheme selected by the user. At this time, the distribution apparatus 20 adjusts the total reproduction time of the summary data in such a way as to be shorter than the current reproducible time Ta of the reproduction apparatus 10. If the time taken to create the summary is long, the remaining power of the battery 100 drastically reduces, which may shorten the reproducible time. Thus, the reproduction apparatus 10 of this second embodiment predicts the reproducible time Ta at predetermined intervals during summary data is created and notifies it to the distribution apparatus 20.

In step S45, the reproduction control section 103 requests the distribution apparatus 20 to distribute summary data and starts to reproduce the summary data. The communication section 105 receives the summary data distributed from the distribution apparatus 20 and supplies it to the reproduction control section 103. If video data is found in the summary data, the reproduction control section 103 processes it and supplies it to the display section 106 and if audio data is found in the summary data, the reproduction control section 103 processes it and supplies it to the speaker section 107. Unlike the reproduction apparatus 10 according to the first embodiment, the reproduction apparatus 10 according to the second embodiment does not restrict operations such as fast rewind, fast forward, and pause except a stop operation after the reproduction of the summary data is started. Therefore, if these operations are performed during reproduction, the remaining power of the battery may become too small to reproduce all summary data. Operations in and after step S46 will be carried out to handle such a case.

In step S46, the reproduction control section 103 decides whether the reproduction of the summary data is completed or not.

If the reproduction of the summary data is not completed (NO in step S46), the process moves on to step S47 and the reproduction control section 103 calculates a remaining reproduction time Trs which is the time required to reproduce all the remaining summary data.

In step S48, the reproduction control section 103 makes the detection section 101 detect the current remaining power of the battery 100 and makes the prediction section 102 predict the current reproducible time Ta. At this time, the detection section 101 detects the current remaining power of the battery 100 and notifies it to the prediction section 102. In turn, the prediction section 102 predicts the current reproducible time Ta using the current remaining power of the battery 100 and notifies it to the reproduction control section 103.

In step S49, the reproduction control section 103 decides whether the current reproducible time Ta is longer than the remaining reproduction time Trs or not. This decision corresponds to a decision as to whether the summary data can be reproduced to the end or not. When the current reproducible time Ta is longer than the remaining reproduction time Trs (YES in step S49), the reproduction control section 103 makes the distribution apparatus 20 continue to distribute the summary data.

When the reproducible time Ta is not longer than the remaining reproduction time Trs (NO in step S49), the summary data cannot be reproduced to the end. In this case, the process moves on to step S50 and the reproduction control section 103 notifies the current reproducible time Ta to the distribution apparatus 20 and at the same time requests the distribution apparatus 20 to change the content of the summary data. The distribution apparatus 20 changes the content of the summary data according to the summary scheme selected by the user. At this time, the distribution apparatus 20 adjusts the total reproduction time of the summary data in such a way as to be shorter than the current reproducible time Ta of the reproduction apparatus 10. After changing the content of the summary data, the distribution apparatus 20 distributes the changed summary data to the reception apparatus 10. The communication section 105 receives the summary data distributed from the distribution apparatus 20 and supplies it to the reproduction control section 103. If video data is found in the summary data, the reproduction control section 103 processes it and supplies it to the display section 106 and if audio data is found in the summary data, the reproduction control section 103 processes it and supplies it to the speaker section 107.

As described above, the reproduction apparatus 10 according to the second embodiment can perform reproduction processing in consideration of the remaining power of the battery 100. Furthermore, when the remaining power of the battery 100 is too small for the user to reproduce the selected digital data to the end, the reproduction apparatus 10 according to the second embodiment can warn the user of it. Furthermore, the reproduction apparatus 10 according to the second embodiment need not restrict operations such as fast rewind, fast forward, and pause even in a summary reproduction mode.

Third Embodiment

The third embodiment will explain the processing of a battery-driven moving image transmission apparatus to which the present invention is applied as an example.

Figure 4:
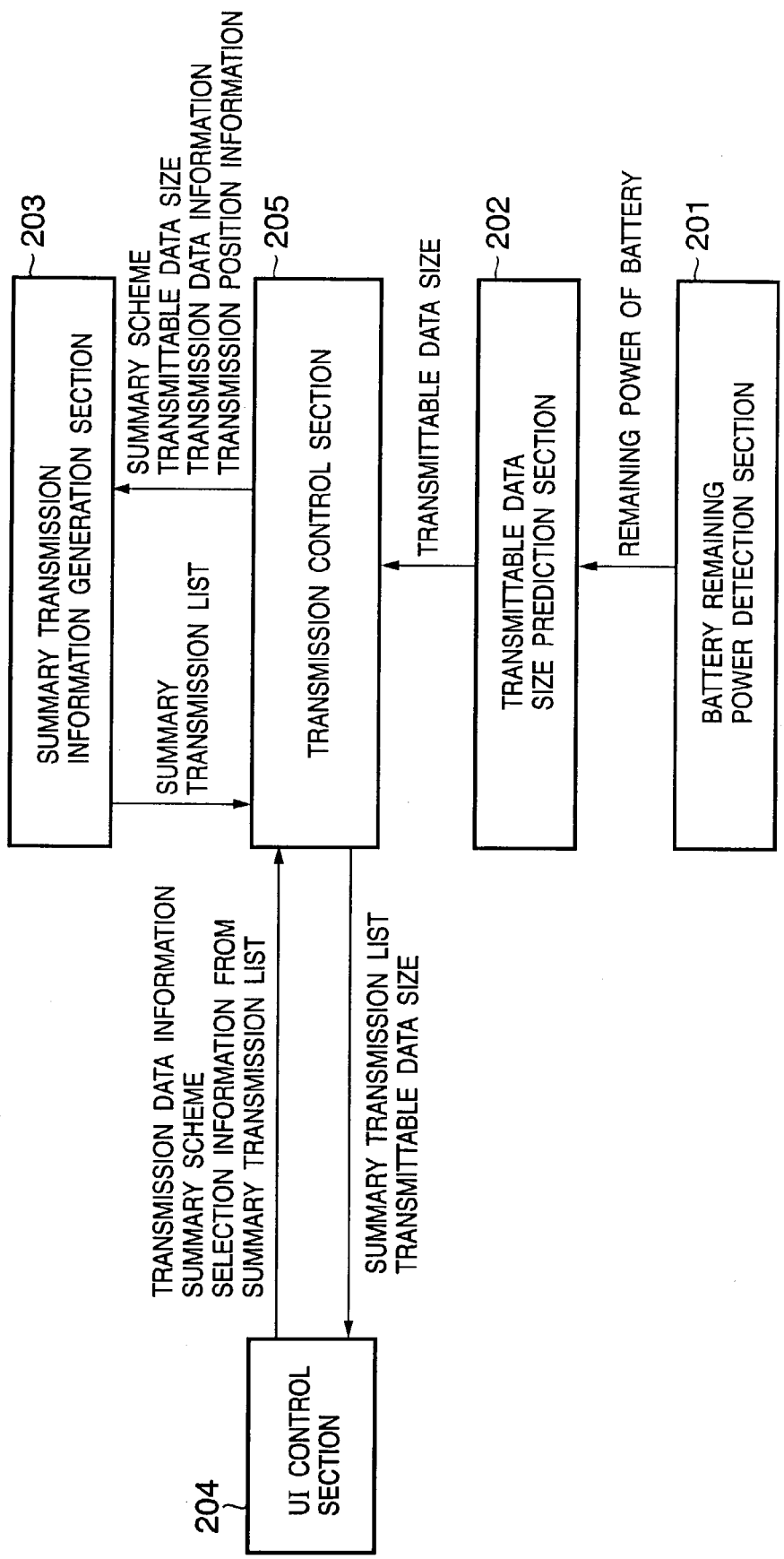
FIG. 4 is a block diagram showing a configuration of a liquid crystal display portable moving image transmission terminal according to a third embodiment of the present invention.

FIG. 4 is a block diagram showing a configuration of a moving image transmission apparatus having a liquid crystal display section according to the third embodiment. As shown in FIG. 4, in addition to the function of sending moving images, the moving image transmission apparatus includes a battery remaining power detection section 201 that detects the remaining power of the battery, a transmittable data size prediction section 202 that calculates a transmittable data size on the basis of the remaining power of the battery, a summary transmission information generation section 203 that generates information necessary to accommodate a summary of a specified moving image within a specified data size, a UI control section 204 that plays the role of receiving information such as a summary scheme or transmission target data from the user or generating a summary transmission list to create a summary within the transmittable data size or the like, and a transmission control section 205 that supervises the information from the various above-described sections and controls transmission of moving images.

Figure 5:
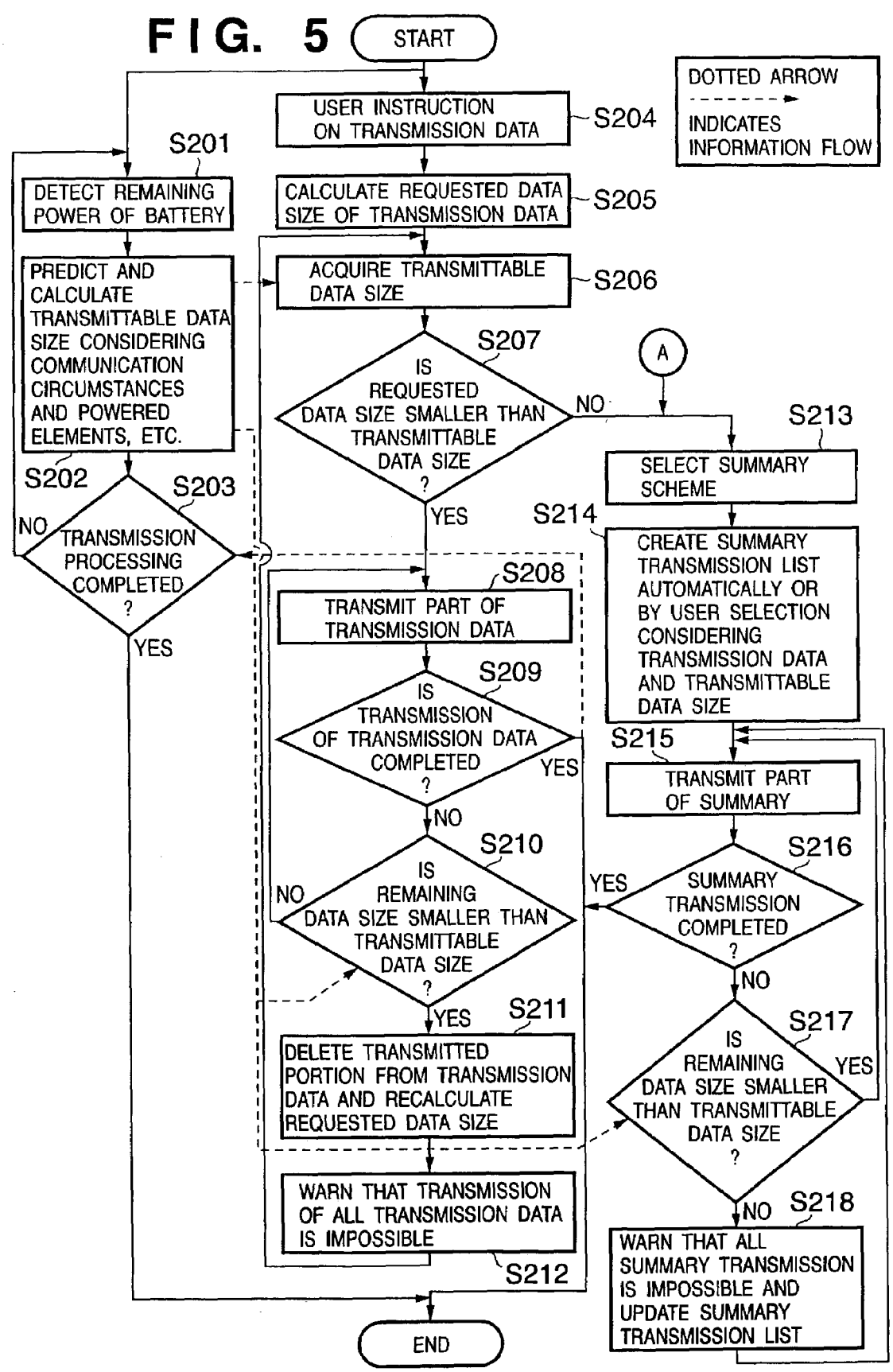
FIG. 5 is a flow chart showing a processing procedure according to the third embodiment of the present invention.

FIG. 5 shows a flow chart of processing according to the third embodiment of the present invention.

The processing according to the third embodiment is roughly divided into a process of monitoring a transmittable data size in steps S201 to S203 and a process of sending a summary of a moving image within the transmittable data size in steps S204 to S218 and these two processes are preferably performed in parallel.

These two processes are related to each other in flows of information expressed by dotted lines, and in step S202, it is possible to read information on the transmittable data size as required. It is when the completion of image transmission carried out in steps S204 to S218 is detected in step S203 that the process of monitoring a transmittable data size in steps S201 to S203 is completed.

For example, it is possible to configure processes in steps S201 to S203 using dedicated hardware so that the processes in steps S206, S210 and S217 can acquire the transmittable data size acquired in step S202 anytime or using a multi-thread technique when configuring the processes by software to acquire the transmittable data size and transmission completion state using a shared memory.

First, the moving image transmission apparatus obtains the remaining power of the battery through the battery remaining power detection section 201 in step S201, acquires a data transmission rate from the result obtained in step S201 and communication situation in step S202 and the transmittable data size prediction section 102 predicts the transmittable data size based on this information. A technology of mounting a CPU in a battery unit and monitoring the remaining power of the battery based on this information from the CPU is employed in a notebook PC, etc., in recent years and it is possible to know the remaining power of the battery using such a known technology. Moreover, when the moving image transmission apparatus includes a liquid crystal display section, it is known that the liquid crystal display section consumes power most, and it is possible to predict the transmittable data size virtually accurately by adding power consumption around the storage device drive circuit and power for performing image encoding processing, etc., to the power consumption by the display. However, it is preferable to set a value relatively smaller than the predicted value as the transmittable data size considering an adequate margin.

Then, in step S203, the processing is completed when the transmission processing is completed, but if the transmission process is not completed, the processes in step S201 and step S202 are carried out repeatedly to monitor the transmittable data size.

Next, the transmission processing in steps S204 to S218 will be explained.

In step S204, data to be transmitted (transmission data) is designated by the user using the user interface by the UI control section 204. Movie DVD data, etc., is typically divided into a plurality of chapters and documentary or news, etc., are also often divided into a plurality of chapters. Therefore, transmission data includes the data designated by the following two types of operations. When the user specifies a jump to a certain chapter, the first operation decides that all data from this chapter onward will be sent and regards this data as the transmission data. At a transmission apparatus that has program transmission for which a plurality of chapters are selected beforehand, the second operation regards a plurality of programmed chapters as the transmission data.

Next, in step S205, the total data size of the designated transmission data (referred to as "requested data size" hereinafter) is calculated, and in step S206, the transmittable data size is obtained using the remaining power of the battery calculated in step S202.

In step S207, it is decided whether or not the requested data size is smaller than the transmittable data size. If the requested data size is smaller, the designated transmission data can be sent with the remaining power of the battery acquired in step S205, and therefore the transmission data is sent with the loop in steps S208 to S210.

In this loop of transmission, in step S208, a part of the transmission data is sent, and in step S209 whether the transmitted partial data is an end of the transmission data or not is determined. If it is not the end of the transmission data, it is decided in step S210 whether the remaining data size is greater or smaller than the transmittable data size obtained in step S202. This operation is performed to monitor whether enough power is remained in the battery during transmission. For example, when a transmission rate slows down during transmission due to deterioration of communication circumstances or transmission power needs to be increased, more battery power is consumed than during normal transmission and the transmittable data size decreases. Therefore, in order to check this, it is confirmed in step S209 and step S210 whether the remaining data size is greater than the transmittable data size or not.

It should be noted that since it is necessary to make sure that an image transmission/display operation is not interrupted by the processes in step S209 and step S210, these processes are carried out in the background. Furthermore, it is also possible to carry out these processes in parallel to the transmission process in a different process as in the case of multithread processing or use a timer interrupt in a load range within which transmission of moving images is not interrupted.

When the remaining data size is decided to be greater than the transmittable data size in step S210, the data that has been sent so far is removed from the entire transmission data in step S211 and an alarm is issued indicating that the transmission data cannot be sent to the end in step S212 and the process moves back to step S206.

On the other hand, if the requested data size is decided to be greater than the transmittable data size in step S207, the process moves on to step S213 and any one of the plurality of summary schemes is selected by the user. This plurality of summary schemes will be described in detail later. It is also possible to use a fixed summary scheme instead of selecting one from the plurality of summary schemes.

In addition to the plurality of summary schemes, it is also possible to add a choice of carrying out normal transmission of the designated transmission data sequentially until the battery is exhausted.

In step S214, a summary transmission list is created automatically or by the user's choice based on the summary scheme selected in step S213 in consideration of the transmission data and transmittable data size. This summary transmission list creation process will be described in detail later.

Next, transmission is carried out in the loop in steps S215 to S218 based on the summary transmission list.

In the transmission loop based on this summary transmission list, the part of the transmission data is sent in step S215 and it is decided in step S216 whether the transmitted part of data is an end of the transmission data or not. If it is not the end of the transmission data, it is decided in step S217 whether the remaining data size is greater or smaller than the transmittable data size obtained in step S202. This is performed to monitor whether or not the enough power is remained in the battery during transmission.

For example, when a transmission rate slows down during transmission due to deterioration of communication circumstances or transmission power needs to be increased, more battery power is consumed than during normal transmission and the transmittable data size decreases. Therefore, in order to check this, it is confirmed in step S216 and step S217 whether the remaining data size is smaller than the transmittable data size or not.

Since it is necessary to make sure that an image transmission/display operation is not interrupted by the processes in step S216 and step S217, these processes are also carried out in the background.

When the remaining data size is decided to be greater than the transmittable data size in step S217, the data that has been sent so far is removed from the summary transmission list in step S218 and an alarm is issued indicating that all the summary data cannot be sent and the portion to be transmitted is selected from the remaining summary data and a summary transmission list is created again. The process of updating the summary transmission list in step S218 will be described later in detail with reference to FIG. 10.

In addition to updating the summary transmission list, it is also possible to add a choice of carrying out normal transmission of the summary data based on the summary transmission list created in step S214 until the battery is exhausted. In this case, by substituting a sufficiently large dummy value for the transmittable data size in step S202, it is possible to carry out the procedure with the same algorithm.

Next, four examples of summary schemes which can be selected in step S213 will be explained.

Summary Scheme 1

A change in amount of characteristic data of designated transmission data is automatically calculated and a summary in the transmittable data size which can be transmitted with the remaining power of the battery is created based thereon. For example, portions of an image or sound with a small change or contrarily portions with a big change or portions with a small amount of specific characteristic data or contrarily portions with a large amount of specific characteristic data, etc., are detected and those portions are connected with one another giving priority to the degrees of the detected portions. In this way, it is possible to create a simple summary of the transmittable data size.

With regard to images, methods described in Japanese Patent Application Laid-Open Nos. 2000-235637 and 2000-235638, etc., are already proposed.

Japanese Patent Application Laid-Open No. 2000-235637 compares the degree of similarity between image frames, divides images into small scenes according to the change and gathers a plurality of partial moving images starting from break points until a target time by giving higher priority to images having drastically changing scenes. Furthermore, Japanese Patent Application Laid-Open No. 2000-235638 compares the degree of similarity between image frames, divides images into small scenes according to the changes and, associates each scene with the amount of image variation characteristic such as "gentle scenes", "dynamic scenes", etc., according to the degree of similarity between the image frames and selects these viewpoints to thereby create a "summary consisting of gentle scenes" or "summary consisting of dynamic scenes." These are intended to create a summary of the target time, but if the process is changed to one that creates a summary of the desired data size, the process can be carried out easily.

With respect to sound, there is a method of creating a summary by detecting voicing sections and gathering the voicing sections and it is possible to gather scenes up to a target time by gathering scenes with higher energy preferentially. This can also be easily realized if the process is changed to one that creates a summary to get a target data size.

Summary Scheme 2

All topics and categories in designated transmission data are displayed, the user selects ones that he/she wants to send from among them and a relationship between the requested data size and transmittable data size according to the remaining power of the battery in that case is displayed.

Figure 7:
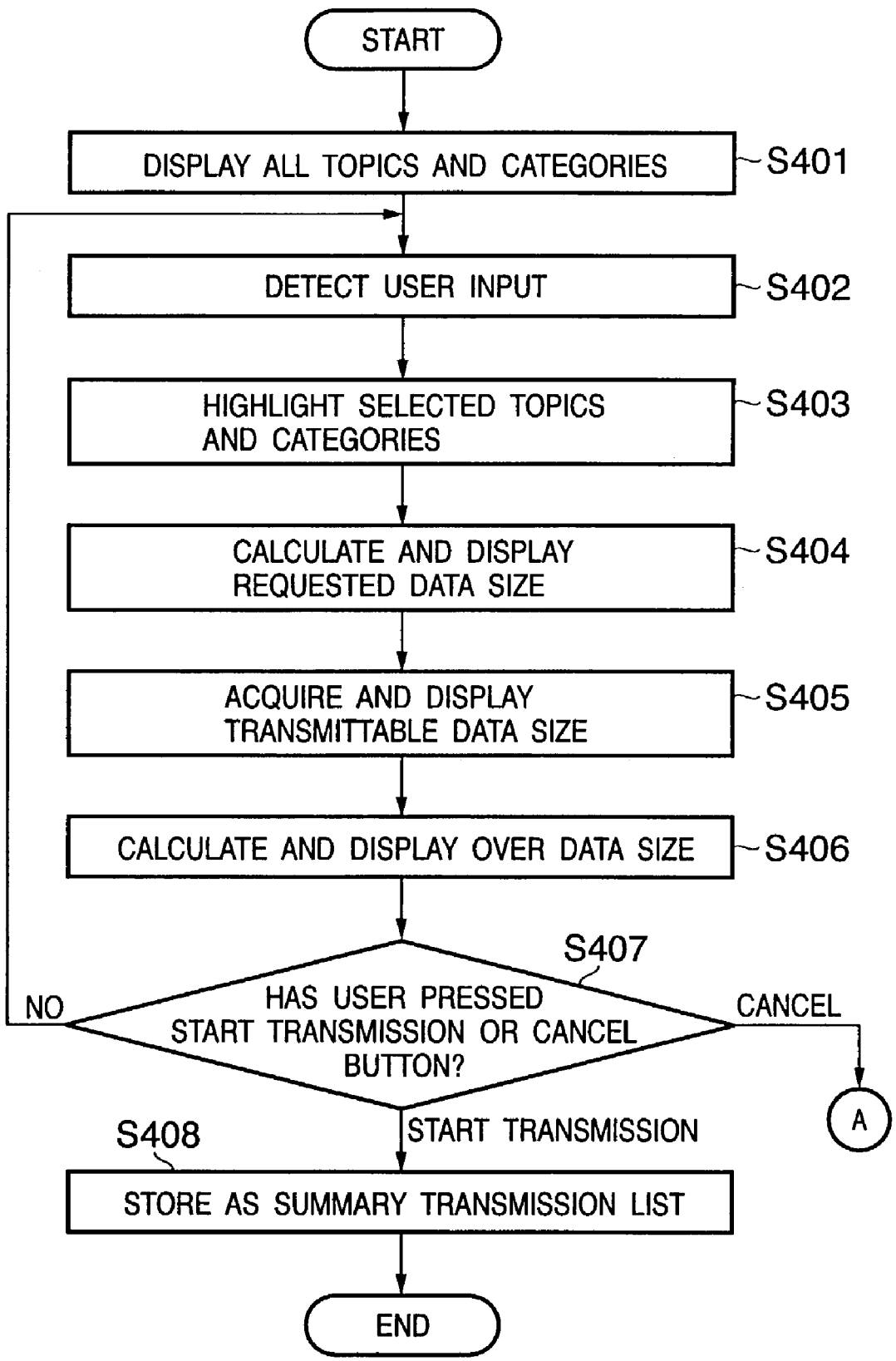
FIG. 7 is a flow chart showing a summary transmission list creation process based on the summary scheme 2 according to the third embodiment of the present invention.

FIG. 7 shows a flow chart of a summary transmission list generation process carried out in step S214 when the summary scheme 2 is selected in step S213.

Figure 6:
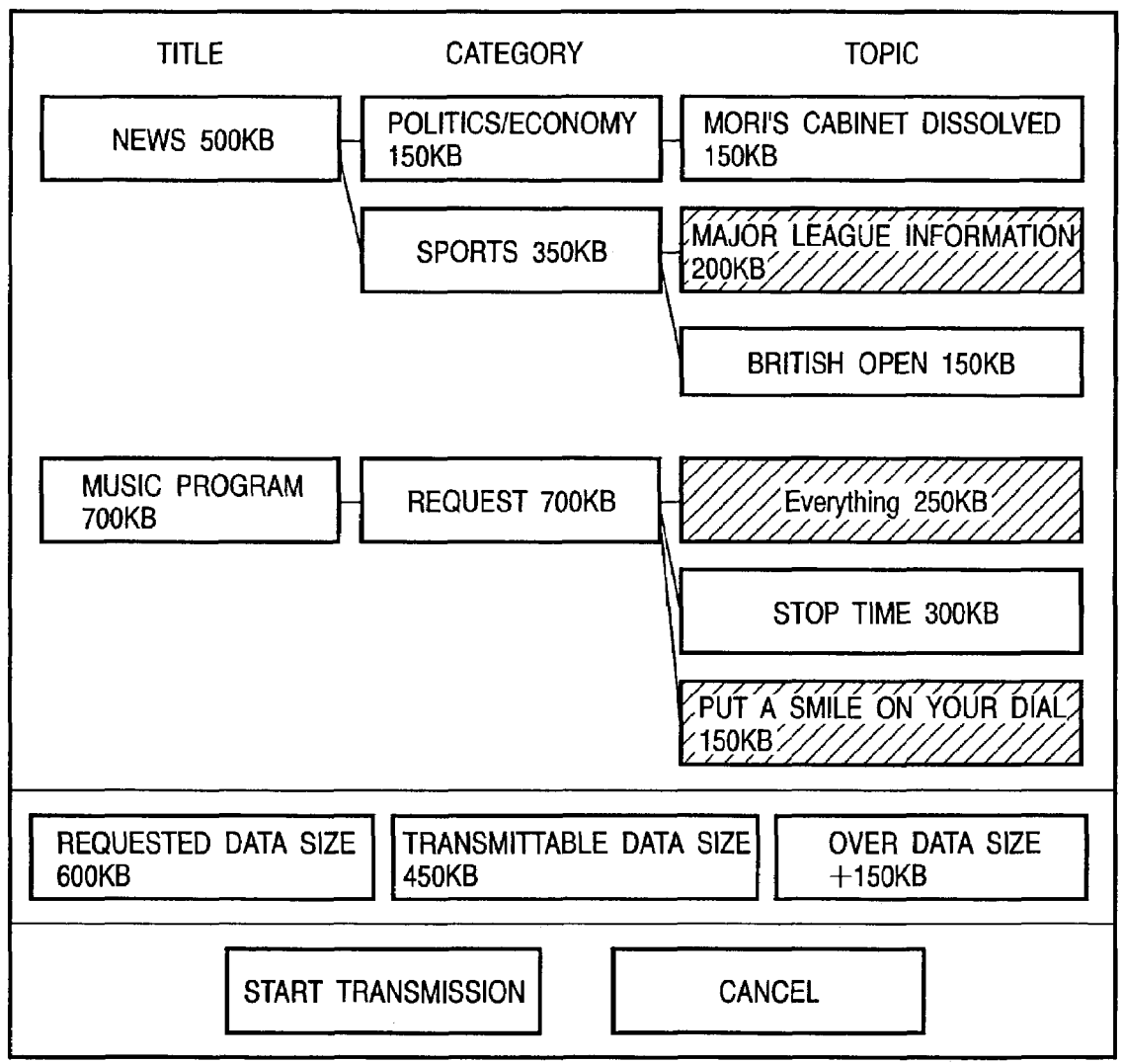
FIG. 6 illustrates an example of a user interface based on a summary scheme 2 according to the third embodiment of the present invention.

In step S401, as shown in FIG. 6, for example, a title and a category of a moving image are displayed and a topic is displayed as their subordinate attribute. The data size of each topic is displayed next to the topic name, a total data size of all topics in the category is displayed next to the category name and a total data size of all categories in the title is displayed next to the title name.

In step S402, the content selected by the user is detected. When a topic is selected, the topic is detected and when a category is selected, it is decided that all topics in the category are selected and when a title is selected, it is decided that all categories and topics in the title are selected. When the user selects a title, category or topic which has not been selected yet, it is decided that the title, category or topic is "selected (to be registered in a summary transmission list which will be described later)" and when the user selects a title, category or topic which has already been selected, it is decided that the title, category or topic is "deselected (to be removed from the summary transmission list)."

In step S403, the title, category or topic selected by the user is highlighted (highlighting is canceled in the case of deselection) and at the same time, it is registered in the transmission data list (summary transmission list) (to be removed from the list in the case of deselection). In step S404, the requested data size which is a total data size of the currently selected title, category and/or topic is calculated and displayed. In step S405, the transmittable data size is acquired according to the remaining power of the battery and displayed. In step S406, the requested data size is compared with the transmittable data size and the comparison result is displayed.

More specifically, when the requested data size exceeds the transmittable data size, the data size by which the requested data size exceeds the transmittable data size, that is, the over data size is calculated and displayed in positive, while the requested data size does not exceed the transmittable data size, the over data size is displayed in negative. When the requested data size exceeds the transmittable data size, it is also possible to issue an alarm by blinking the display, issuing a sound or sound message or using a combination thereof, etc. This over data size display allows the user to delete a topic or category exceeding by this over data size from the selection list or specify a category or topic that falls within the remaining transmittable data size and thereby easily accommodate the summary within the transmittable data size to the full.

Since the display remains ON during a selection, the battery power is consumed and the remaining power of the battery reduces. The power consumed by the display is relatively large in the transmission apparatus, and therefore the power corresponding to the lapse of time during the selection must be reflected in the transmittable data size.

However, in order to avoid putting pressure on the user during the selection, it is also possible to secure the time normally required to create a summary transmission list beforehand, subtract the data size corresponding to the power consumption from the transmittable data size, carry out summary transmission without reducing the transmittable data size if the summary transmission list can be created within the secured time, and subtract the transmittable data size and update and display it if the summary transmission list cannot be created within the time.

Then, in step S407, when the start transmission button is pressed, the summary transmission list is recorded assuming that the creation of the summary transmission list has been completed (step S408) and the process moves on to step S215 in FIG. 5. Whereas, when the cancel button is pressed, the created summary transmission list is canceled and the process moves back to step S213 in FIG. 5. If none of these buttons is pressed, the process moves back to step S402 and repeats the above-described processing.

It is often the case that the transmittable data size is exceeded whichever topic is selected as the last topic of the summary transmission list, and the selected transmission data does not fit to the transmittable data size. In such a case, the topic that does not fall within the transmittable data size may be removed from the summary transmission list, but some users may want to transmit the summary until the battery is exhausted. In such a case, the system may be configured such that transmission is carried out according to the summary transmission list by pressing the start transmission button even when the over data size is positive.

Summary Scheme 3

Information on preferences of the destination or sender user is stored beforehand, a preferred topic or category is automatically selected preferentially based on this information and a summary is created in a data size transmittable with the remaining power of the battery. The destination or sender is selectable because there are two cases; when the sender performs transmission based on his/her preference and when the sender performs transmission based on the preference of the destination. The destination information also includes information on preferences of a plurality of destinations in a group, for instance.

Figure 8:
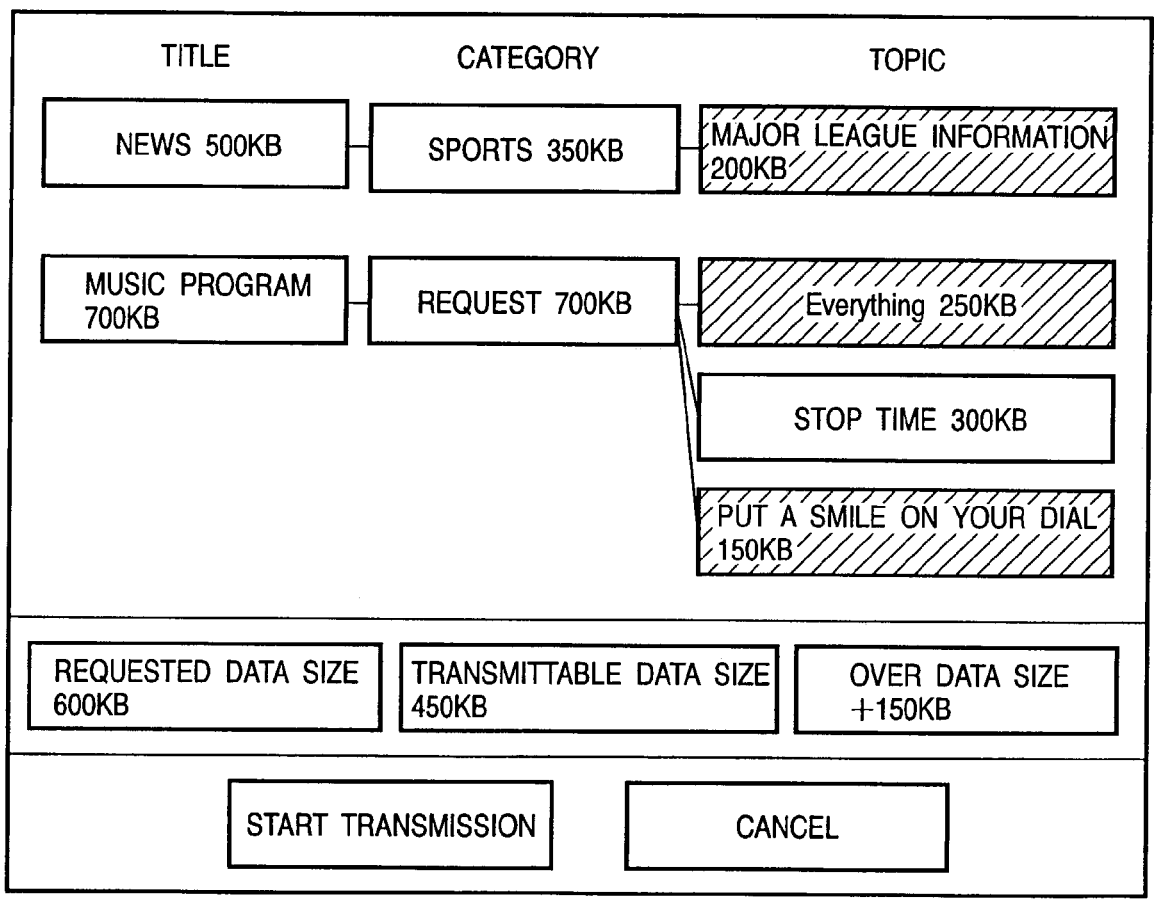
FIG. 8 illustrates an example of a user interface based on a summary scheme 4 according to the third embodiment of the present invention.

In the example shown in FIG. 6 according to summary scheme 2, all titles, categories and topics are displayed and the user arbitrarily selects contents to be sent from them, but if the user likes sports and music and dislikes a political topic, the summary scheme 3 automatically and internally selects a title, category and topic related to sports and music as shown in FIG. 8 and automatically creates a summary transmission list from them.

At this time, topics and categories of the user's preferences are assigned priority order and entries are made in the summary transmission list in this priority order. For the last entry of topic or category, a topic or category that falls within the transmittable data size is given higher priority among the topics and categories of the same priority order.

MPEG-7 under study by the ISO international standard defines a data structure describing user preferences or a data structure for sending a summary for each point of view and if information on these user preferences and the summary is described for moving images to be sent, this information is collated with prestored information on user preferences and it is possible to further create a summary that falls within the transmittable data size with the battery using preferential information of user preferences.

Summary Scheme 4

Information on user preferences is prestored, a title, category and topic of preferences are displayed based on this information, the user selects desired items from the displayed category and topic. A relationship between the total data size and transmittable data size according to the remaining power of the battery is displayed. An alarm is issued on a display or with sound or sound message or a combination thereof when the total data size exceeds the transmittable data size so that the user can select items within the transmittable data size to create a summary.

Figure 9:
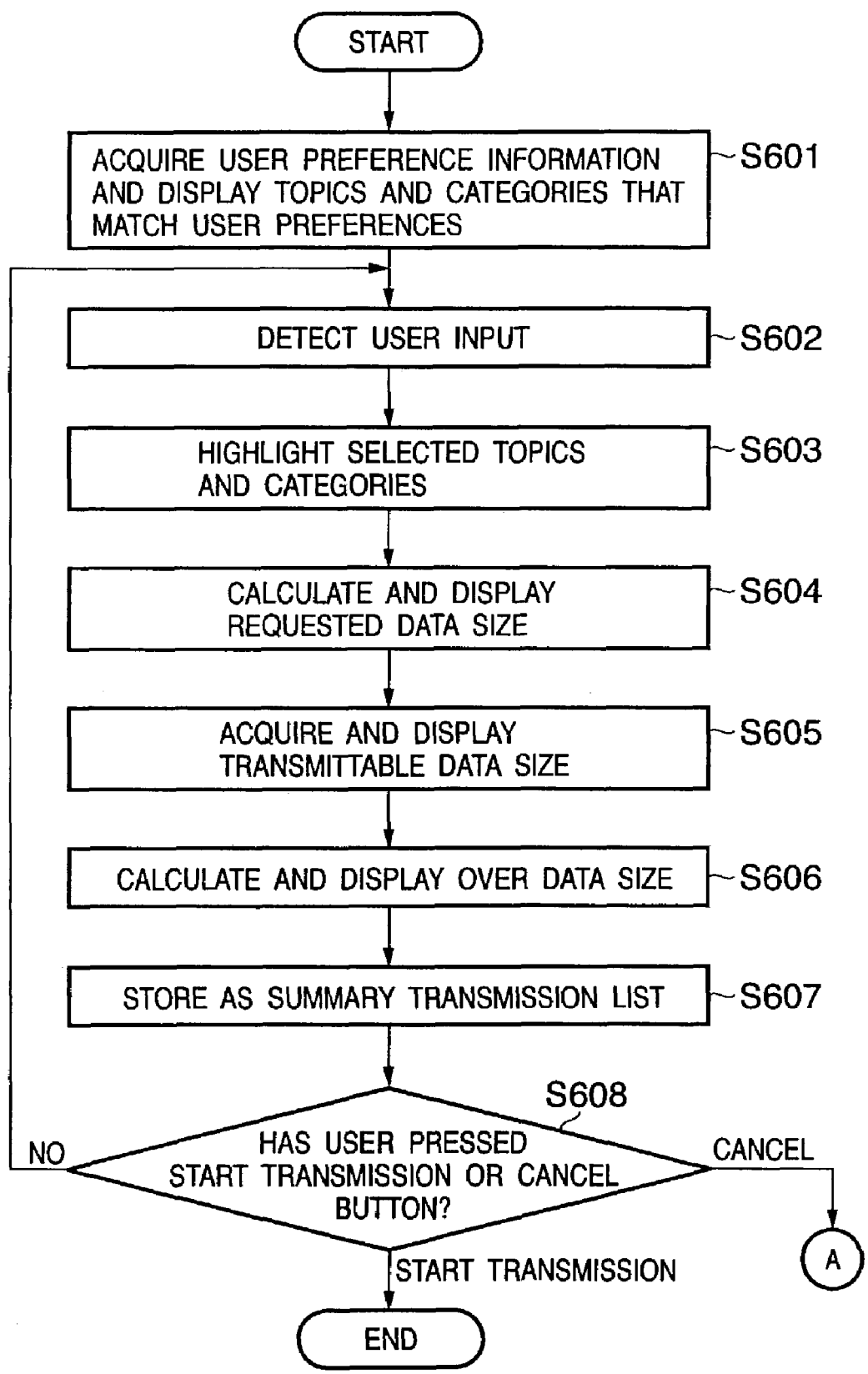
FIG. 9 is a flow chart showing a summary transmission list creation process based on the summary scheme 4 according to the third embodiment of the present invention.

FIG. 9 shows a flow chart of a summary transmission list creation process carried out in step S214 when the summary scheme 4 is selected in step S213 in FIG. 5.

The example shown in FIG. 6 according to the summary scheme 2 displays all titles, categories and topics, but if the user likes sports and music, and dislikes a political topic, for example, the summary scheme 4 only displays a category and topic about sports and music as shown in FIG. 8 in step S601. The data sizes of all topics are displayed next to the category name and the data size of each topic is displayed next to the topic name.

In step S602, the content selected by the user is detected. When a topic is selected, the topic is detected and when a category is selected, it is decided that all topics in the category are selected and when a title is selected, it is decided that all categories and all topics in the title are selected. Here, when the user selects a title, category or topic which has not been selected yet, it is decided that the title, category or topic is "selected (to be registered in a summary transmission list)" and when the user selects a title, category or topic which has already been selected, it is decided that the title, category or topic is "deselected (to be removed from the summary transmission list)."

In step S603, the title, category or topic selected by the user is highlighted (highlighting is canceled in the case of deselection) and at the same time, it is registered in the transmission data list (deleted from the list in the case of deselection). In step S604, the requested data size which is a total data size of the currently selected title, category and/or topic is calculated and displayed. In step S605, the transmittable data size is acquired according to the remaining power of the battery and displayed. In step S606, the requested data size is compared with the transmittable data size and the comparison result is displayed.

More specifically, when the requested data size exceeds the transmittable data size, the data size by which the requested data size exceeds the transmittable data size, that is, the over data size is calculated and displayed in positive, while the requested data size does not exceed the transmittable data size, the over data size is displayed in negative.

When the requested data size exceeds the transmittable data size, it is also possible to issue an alarm by blinking the display, issuing sound or sound message or using a combination thereof, etc. This over data size display allows the user to delete a topic or category exceeding by this over data size from the selection list or specify a category or topic that falls within the remaining transmittable data size and thereby easily accommodate the summary within the transmittable data size to the full.

Since the display remains ON during a selection, the battery power is consumed and the remaining power of the battery reduces. The power consumed by the display is relatively large in the transmission apparatus, and therefore the power corresponding to the lapse of time during the selection must be reflected in the requested data size.

However, in order to avoid putting pressure on the user during the selection, it is also possible to secure the time normally required to create a summary transmission list beforehand, subtract the data size corresponding to the power consumption from the transmittable data size, carry out summary transmission without reducing the transmittable data size if the summary transmission list can be created within the secured time, and subtract the transmittable data size and update and display it if the summary transmission list cannot be created within the time.

Then, in step S607, the created summary transmission list is recorded. In step S608 when the start transmission button is pressed, the process moves on to processes in and after step S215 in FIG. 5 and when the cancel button is pressed, the created summary transmission list is canceled and the process moves back to step S213 in FIG. 5. If none of these buttons is pressed, the process moves back to step S602 and repeats the above-described processing.

It is often the case that the transmittable data size is exceeded whichever topic is selected as the last topic of the summary transmission list, and the selected transmission data does not fit to the transmittable data size. In such a case, the topic that does not fall within the transmittable data size may be removed from the summary transmission list, but some users may want to transmit the summary until the battery is exhausted. In such a case, the system may be configured such that transmission is carried out according to the summary transmission list by pressing the start transmission button even when the over data size is positive.

As described above, when the transmission data size of the designated data is greater than the transmittable data size with the current remaining power of the battery, the user can specify the data to be sent in such a way that the remaining power of the battery is enough to do so based on the alarm and in consideration of the remaining power of the battery.

Next, the re-creation of a summary transmission list in step S218 will be explained. The re-creation of a summary transmission list carried out in step S218 differs depending on the summary scheme selected in step S213.

As in the cases of the summary schemes 1 and 3 in which a summary is created automatically, the user does not clearly grasp what the content of the summary will be like, and therefore no alarm is issued and the summary is handled by shortening the summary so that it falls within an appropriate transmittable data size. In the case of the summary scheme 3, for example, it is also possible to delete topics registered in the summary transmission list from the last topic one by one until the summary falls within the appropriate transmittable data size.

Figure 10:
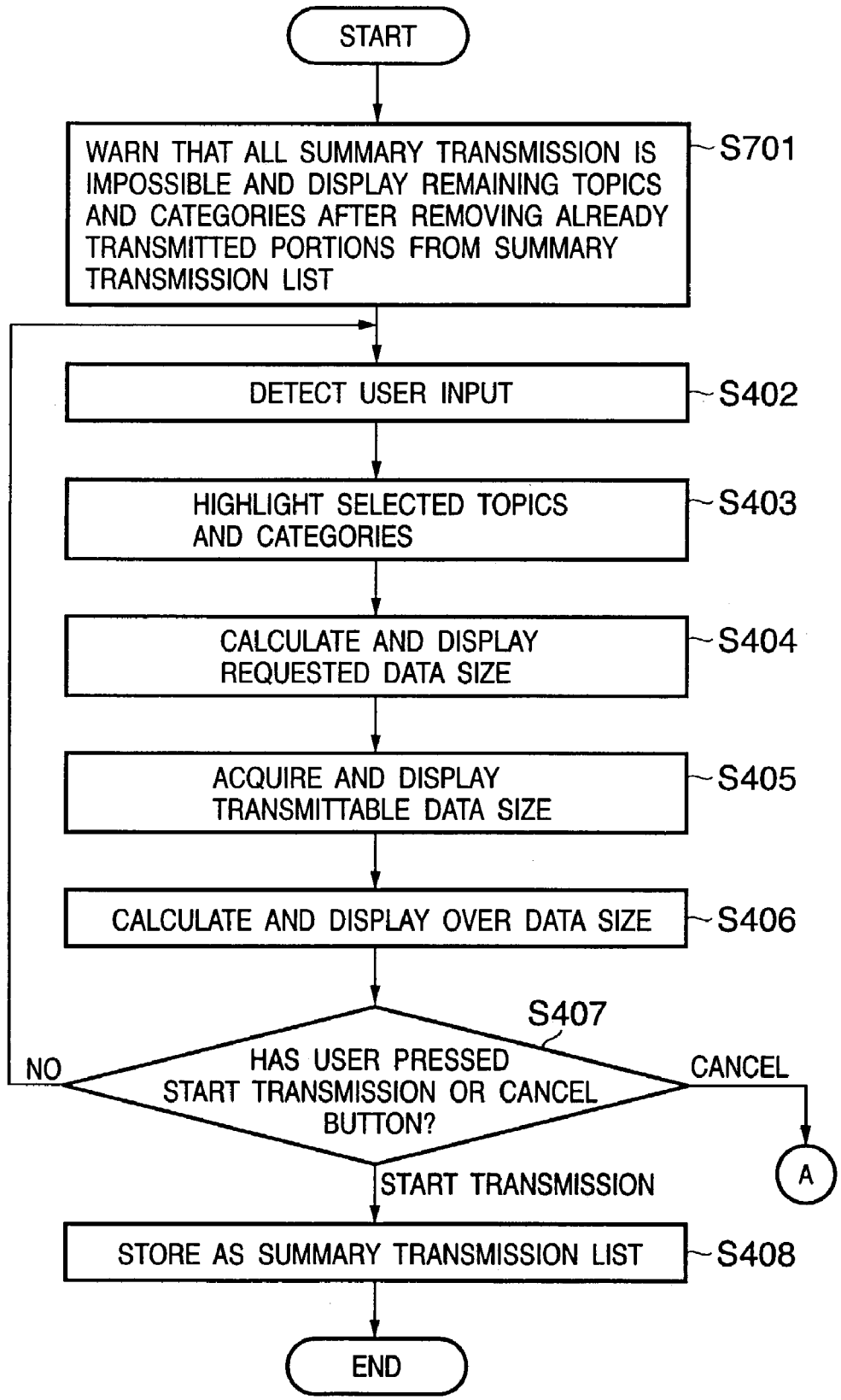
FIG. 10 is a flow chart showing a summary transmission list re-creation process based on the summary scheme 2 according to the third embodiment of the present invention.

As in the case of the summary schemes 2 and 4, when the user specifies the summary content, an alarm is issued on a display or with a sound or sound message or a combination thereof to indicate in step S701 in FIG. 10 that it is not possible to transmit all the specified summary data and the remaining topics and categories except the data sections transmitted so far are displayed according to the procedures shown in FIG. 6 and FIG. 8.

The processes in steps S402 to S408 are the same as the operations explained with reference to FIG. 7, and therefore explanations thereof are omitted here.

As described above, according to the third embodiment of the present invention, data can be transmitted efficiently even if the remaining power of the battery of the moving image transmission apparatus reduces.

The above-described third embodiment has described the case where it is determined in step S217 that the remaining power of the battery is not enough during transmission and a summary transmission list is created in step S218 using the same summary scheme selected in step S213. However, it is also possible to configure the system so that the summary transmission list is reedited using a summary scheme different from the summary scheme specified in step S213.

Fourth Embodiment

The fourth embodiment of the present invention will be explained next.

The fourth embodiment will explain moving image distribution control in a data distribution system consisting of a battery-driven moving image reproduction apparatus and a server which is a moving image distribution apparatus based on a battery status of a terminal.

Figure 11:
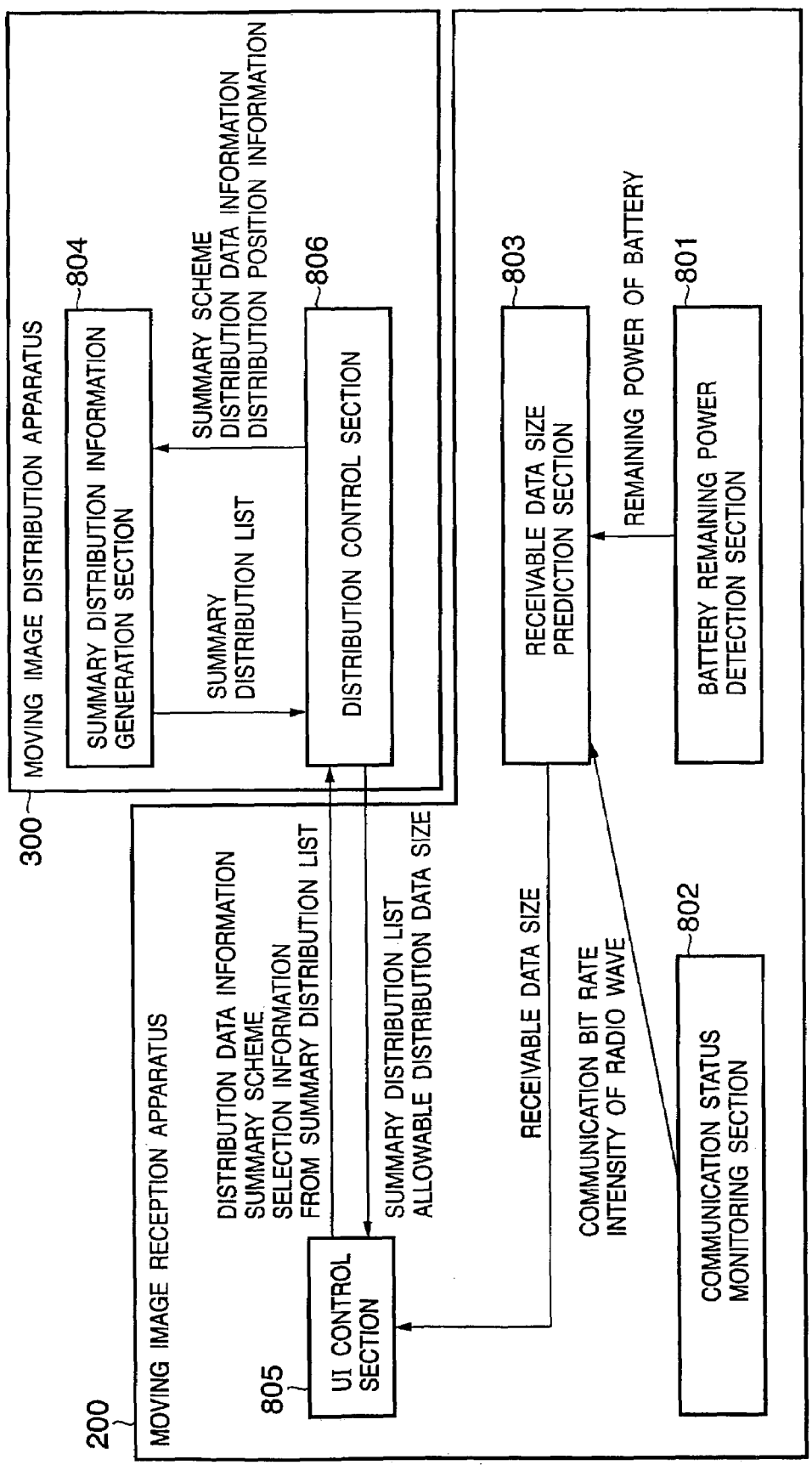
FIG. 11 is a block diagram showing a configuration of a data distribution system according to a fourth embodiment of the present invention.

FIG. 11 is block diagram showing a configuration of a data distribution system made up of a moving image distribution apparatus 300 and a moving image display portable moving image reception apparatus 200 that can be driven by a battery according to the fourth embodiment.

As shown in FIG. 11, in addition to the function of sending moving image data, the moving image reception apparatus 200 includes a battery remaining power detection section 801 that calculates remaining power of a battery, a communication status monitoring section 802 that monitors a communication bit rate and intensity of radio waves, a receivable data size prediction section 803 that calculates a receivable data size from the remaining power of the battery and a UI control section 805 that plays the role of receiving information such as the summary scheme and distribution target data from the user or generating a summary distribution list for summarizing within the receivable data size, and the moving image distribution apparatus 300 includes a summary distribution information generation section 804 that generates information necessary for accommodating a summary of a designated moving image within a receivable data size and a distribution control section 806 that carries out distribution control over moving images by supervising information from the above-described sections.

Figure 12:
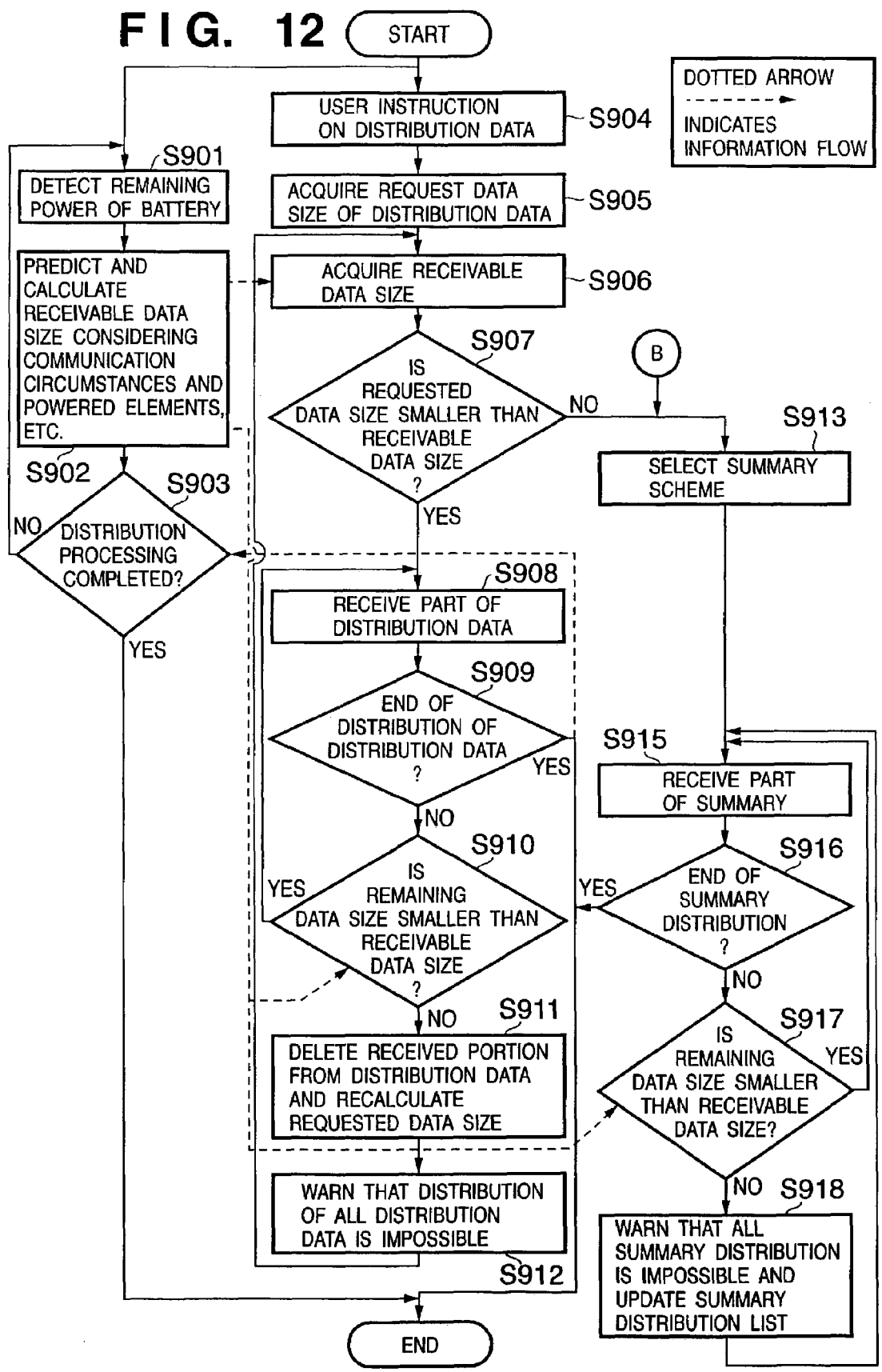
FIG. 12 is a flow chart showing a processing procedure according to the fourth embodiment of the present invention.

FIG. 12 shows a flow chart of the processing by the moving image reception apparatus 200 according to the fourth embodiment of the present invention.

The processing according to the fourth embodiment is roughly divided into a process of monitoring a receivable data size made up of steps S901 to S903 and a process of sending a summary of moving images within the receivable data size in steps S904 to S918 and these two processes are preferably performed in parallel.

These two processes are related to each other in flows of information expressed by dotted lines, and in step S902, it is possible to read information on the receivable data size as required. It is when the completion of image distribution carried out in steps S904 to S918 is detected in step S903 that the process of monitoring a receivable data size made up of steps S901 to S903 is completed.

For example, it is possible to configure processes in steps S901 to S903 using dedicated hardware so that the processes in steps S906, S910 and S917 can acquire the receivable data size acquired in step S902 anytime or using a multithread technique when configuring the processes by software to acquire the receivable data size and distribution completion state using a shared memory.

First, in step S901, the remaining power of the battery is obtained through the battery remaining power detection section 801 and a communication bit rate and information on intensity of radio wave are determined by the communication status monitoring section 802. In step S902, the receivable data size prediction section 803 predicts the receivable data size based on the result obtained in step S901. A technology of mounting a CPU in a battery unit and monitoring the remaining power of the battery based on the information from the CPU is employed in a notebook PC, etc., in recent years and it is possible to know the remaining power of the battery using such a known technology. Moreover, it is also possible to calculate battery duration by summing power consumption of elements involved in a display or communication at the destination and dividing the remaining power of the battery by the sum of power consumption.

As the total power consumption of the moving image reception apparatus 200, power consumption including the storage device, power consumption including the decoder and power consumption for data communication, etc., are added to the power consumption of the liquid crystal display section. Since the received signal sometimes needs to be amplified depending on the intensity of radio wave, when radio wave is judged to be weak, it is necessary to consider the increase of power consumption due to these factors.

Furthermore, by observing communication circumstances, determining an average communication bit rate and multiplying this by battery duration, it is possible to predict a receivable data size. It is preferable to set a value relatively smaller than the predicted value as the receivable data size considering an adequate margin.

The processing is completed when the distribution is completed in step S903, but if the distribution is not completed, the processes in step S901 and step S902 are carried out repeatedly to monitor the receivable data size.

Next, the distribution processing in steps S904 to S918 will be explained.

In step S904, data to be distributed (distribution data) is designated by the user using the user interface by the UI control section 805. Movie DVD data, etc., is usually divided into a plurality of chapters and documentary or news, etc., are also often divided into a plurality of chapters. Therefore, distribution data includes the data designated by the following two types of operations. When the user specifies a jump to a certain chapter, the first operation decides that all data from this chapter onward will be distributed and regards this data as the distribution data. At a distribution apparatus that has program distribution for which a plurality of chapters are selected beforehand, the second operation regards a plurality of programmed chapters as the distribution data.

Next, in step S905, the moving image distribution apparatus 300 calculates the total data size of the designated distribution data (referred to as "requested data size" hereinafter), notifies it to the moving image reception apparatus 200 and the receivable data size using the remaining power of the battery calculated in step S902 is obtained in step S906.

In step S907, it is decided whether the requested data size is greater or smaller than the receivable data size. If the requested data size is smaller, the designated distribution data can be received with the remaining power of the battery, and therefore the distribution data is received with the loop in steps S908 to S910.

In this loop of reception, in step S908, a part of the distribution data is received, and in step S909 whether the received partial data is an end of the distribution target data or not is determined. If it is not the end of the distribution target data, it is decided in step S910 whether the remaining data size is greater or smaller than the receivable data size obtained in step S902. This operation is performed to monitor whether enough power is remained in the battery during reception. For example, when a transmission rate slows down during distribution due to deterioration of communication circumstances or reception power needs to be increased, more battery power is consumed than during normal reception and the receivable data size decreases. Therefore, in order to check this, it is confirmed in step S909 and step S910 whether the remaining data size is greater than the receivable data size or not.

Since it is necessary to make sure that an image reception/display operation is not interrupted by the processes in step S909 and step S910, these processes are carried out in the background. Furthermore, it is also possible to carry out those processes in parallel to the reception process in a different process as in the case of multithread processing or use a timer interrupt in a load range within which distribution of moving images is not interrupted.

When the remaining data size is decided to be greater than the receivable data size in step S910, the data that has been received so far is removed from all the distribution data in step S911 and an alarm is issued indicating that all the distribution data cannot be distributed in step S912 and the process moves back to step S906.

On the other hand, if the requested data size is decided to be greater than the receivable data size in step S907, the process moves on to step S913 and any one of the plurality of summary schemes is selected by the user and an entry of information necessary for the creation of a summary distribution list is accepted. This plurality of summary schemes and creation of the summary distribution list will be described in detail later. It is also possible to use a fixed summary scheme instead of selecting one from the plurality of summary schemes.

In addition to the plurality of summary schemes, it is also possible to add a choice of carrying out normal distribution of the designated distribution data sequentially until the battery is exhausted.

The moving image distribution apparatus 300 creates a summary distribution list automatically or by the user's selection based on the summary scheme selected in step S913 and the user input in consideration of the distribution data and receivable data size.

Next, distribution is carried out in the loop in steps S915 to S918 based on the summary distribution list.

In the distribution loop based on this summary distribution list, the part of the distribution data is received in step S915 and it is decided in step S916 whether the received part of data is an end of the distribution data or not. If it is not the end of the distribution data, it is decided in step S917 whether the data size corresponding to the remaining distribution data (remaining data size) is greater or smaller than the receivable data size obtained in step S902. This is performed to monitor whether or not the enough power is remained in the battery during reception.

For example, when a communication rate slows down during distribution due to deterioration of communication circumstances or reception power needs to be increased, more battery power is consumed than during normal reception and the receivable data size decreases. Therefore, in order to check this, it is confirmed in step S916 and step S917 whether the remaining data size is smaller than the receivable data size or not.

Since it is necessary to make sure that an image reception/display operation is not interrupted by the processes in step S916 and step S917, these processes are also carried out in the background.

When the remaining data size is decided to be greater than the receivable data size in step S917, the data that has been received so far is removed from the summary distribution list in step S918 and an alarm is issued indicating that all the summary data cannot be received and the portion to be viewed is selected so that a summary distribution list can be created again. The process of updating the summary distribution list in step S918 will be described in detail later with reference to FIG. 17.

In addition to updating the summary distribution list, it is also possible to add a choice of carrying out normal distribution of the summary data based on the summary transmission list until the battery is exhausted. In this case, by substituting a sufficiently large dummy value for the receivable data size in step S902, it is possible to carry out the procedure with the same algorithm.

Next, four examples of summary schemes which can bes selected in step S913 will be explained.

Summary Scheme I

A change in amount of characteristic data of designated distribution data is automatically calculated and a summary in a receivable data size which can be transmitted with the remaining power of the battery is created based thereon. For example, portions of an image or sound with a small change or contrarily portions with a big change or portions with a small amount of specific characteristic data or contrarily portions with a large amount of specific characteristic data, etc., are detected and those portions are connected with one another giving priority to the degree of the detected portions. In this way, it is possible to create a simple summary of the receivable data size. This processing is carried out at the moving image distribution apparatus 300 in response to the selection of the summary scheme I at the moving image reception apparatus 200.

With regard to images, methods described in Japanese Patent Application Laid-Open Nos. 2000-235637 and 2000-235638, etc., are already proposed. These references are briefly described in the third embodiment, and thus the description of these references are omitted here.

With respect to sound, there is a method of creating a summary by gathering the voicing sections and it is possible to gather scenes up to a target time by gathering those with higher energy preferentially. This can also be easily realized if the process is changed to one that creates a summary to get a target data size.

Summary Scheme II

All topics and categories in designated distribution data are displayed, the user selects ones that he/she wants to see from among them and a relationship between the requested data size and receivable data size according to the remaining power of the battery is displayed.

Figure 14:
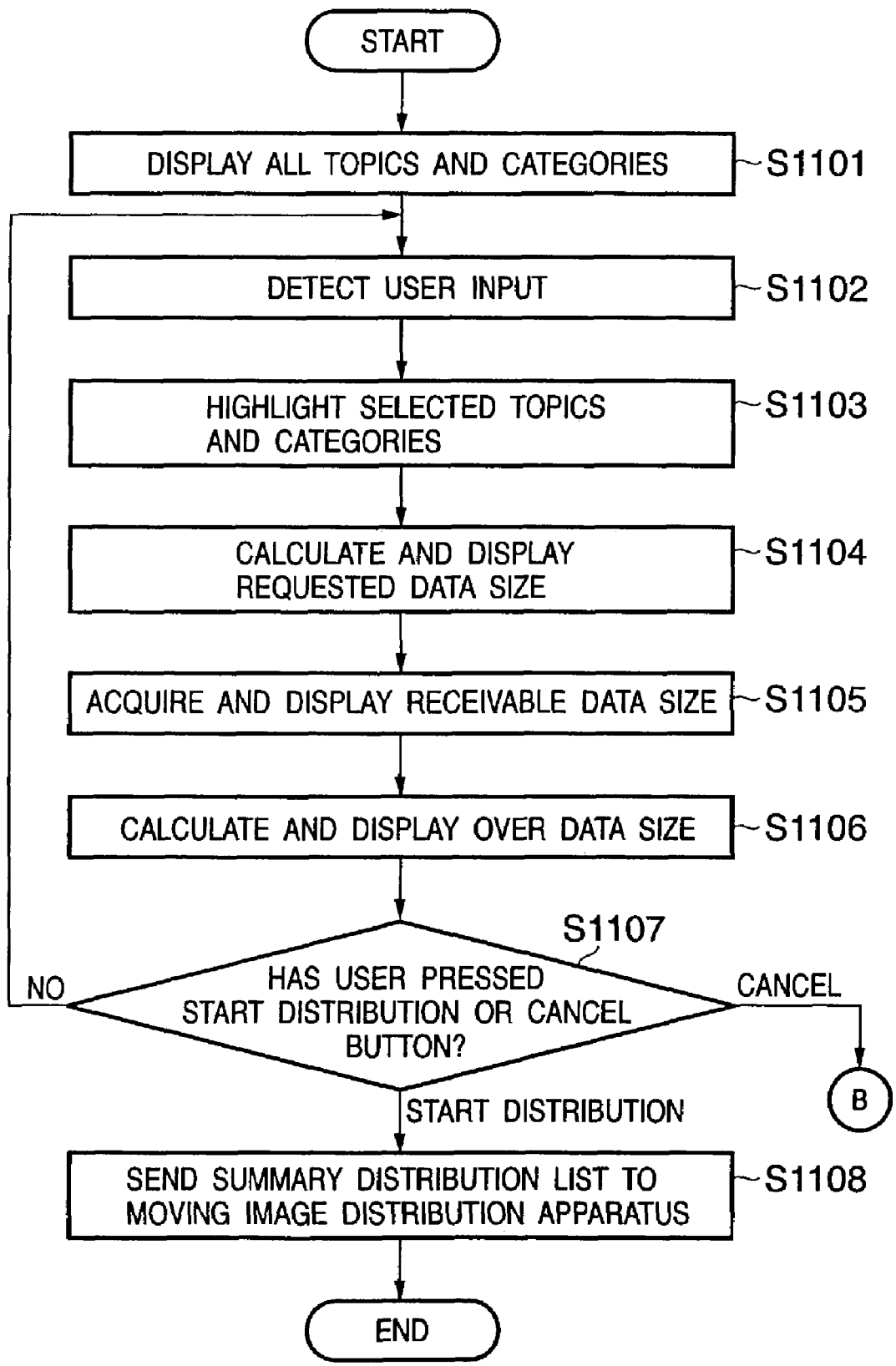
FIG. 14 is a flow chart showing a summary distribution list creation process based on the summary scheme II according to the fourth embodiment of the present invention.

FIG. 14 shows a flow chart of a summary distribution list generation process carried out when the summary scheme II is selected in step S913.

Figure 13:
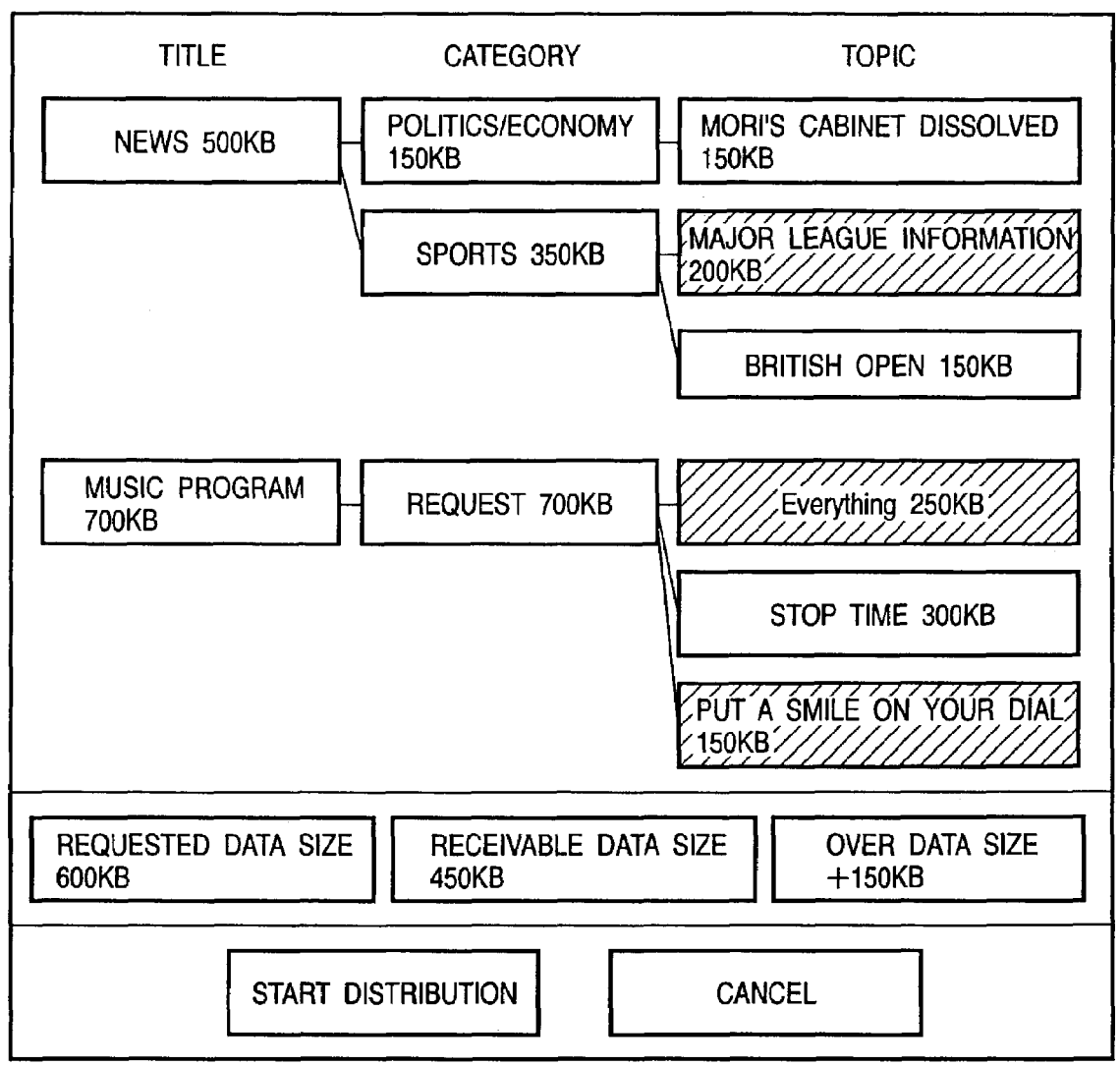
FIG. 13 illustrates an example of a user interface based on a summary scheme II according to the fourth embodiment of the present invention.

In step S1101, as shown in FIG. 13, for example, a title and a category of a moving image are displayed and a topic is displayed as their subordinate attribute. The distribution data size of each topic is displayed next to the topic name, a total distribution data size of all topics in the category is displayed next to the category name and a total distribution data size of all categories in the title is displayed next to the title name. The information shown in FIG. 13 is supplied to the UI control section 805 by the distribution control section 806 in response to the selection of the summary scheme II at the moving image reception apparatus 200.

In step S1102, the content selected by the user is detected. When a topic is selected, the topic is detected and when a category is selected, it is decided that all topics in the category are selected and when a title is selected, it is decided that all categories and topics in the title are selected. When the user selects a title, category or topic which has not been selected yet, it is decided that the title, category or topic is "selected (to be registered in a summary distribution list which will be described later)" and when the user selects a title, category or topic which has already been selected, it is decided that the title, category or topic is "deselected (to be removed from the summary distribution list)."

In step S1103, the title, category or topic selected by the user is highlighted (highlighting is canceled in the case of deselection) and at the same time, it is registered in the distribution data list (summary distribution list) (removed from the list in the case of deselection). In step S1104, the requested data size which is a total data size of the currently selected title, category and/or topic is calculated and displayed. In step S1105, the receivable data size is acquired according to the remaining power of the battery and displayed. In step S1106, the requested data size is compared with the receivable data size and the comparison result is displayed.

More specifically, when the requested data size exceeds the receivable data size, the data size by which the requested data size exceeds the receivable data size, that is, the over data size is calculated and displayed in positive, while the requested data size does not exceed the receivable data size, the over data size is displayed in negative. When the requested data size exceeds the receivable data size, it is also possible to issue an alarm by blinking the display, issuing a sound or sound message or using a combination thereof, etc. This over data size display allows the user to delete a topic or category exceeding by this over data size from the selection list or specify a category or topic that falls within the remaining receivable data size and thereby easily accommodate the summary within the receivable data size to the full.

Since the display remains ON during a selection, the battery power is consumed and the remaining power of the battery reduces. The power consumed by the display is relatively large in the moving image reception apparatus 200, and therefore the power corresponding to the lapse of time during the selection must be reflected in the receivable data size.

However, in order to avoid putting pressure on the user during the selection, it is also possible to secure the time normally required to create a summary distribution list beforehand, subtract the data size corresponding to the power consumption from the receivable data size, carry out summary distribution without reducing the transmittable data size if the summary distribution list can be created within the secured time, and subtract the receivable data size and update and display it if the summary distribution list cannot be created within the time.

Then, in step S1107, when the start distribution button is pressed, it is decided that the creation of summary distribution list has been completed, the created summary distribution list is sent to the moving image distribution apparatus 300 (step S1108) and the process moves on to step S915 in FIG. 12. On the other hand, when the cancel button is pressed, the created summary distribution list is canceled and the process moves back to step S913 in FIG. 12. If none of these buttons is pressed, the process moves back to step S1102 and repeats the above-described processing.

It is often the case that the receivable data size is exceeded whichever topic is selected as the last topic of the summary distribution list, and the selected distribution data does not fit to the receivable data size. In such a case, the topic that does not fall within the receivable data size may be removed from the summary distribution list, but some users may want to receive the summary until the battery is exhausted. In such a case, the system may be configured such that distribution is carried out according to the summary distribution list by pressing the start distribution button even when the over data size is positive.

Summary Scheme III

Information on preferences of the destination or distributor user is stored beforehand, a preferred topic or category is automatically selected preferentially based on this information and a summary is created in a data size receivable with the remaining power of the battery. The destination or distributor is selectable because there are two cases; when the distributor performs distribution based on his/her preference and when the distributor performs distribution according to preference of the destination (receiver). The destination information includes information on preferences of a plurality of destinations in a group, for instance. It should be noted that this processing is carried out by the moving image distribution apparatus 300 in response to the selection of the summary scheme III at the moving image reception apparatus 200.

Figure 15:
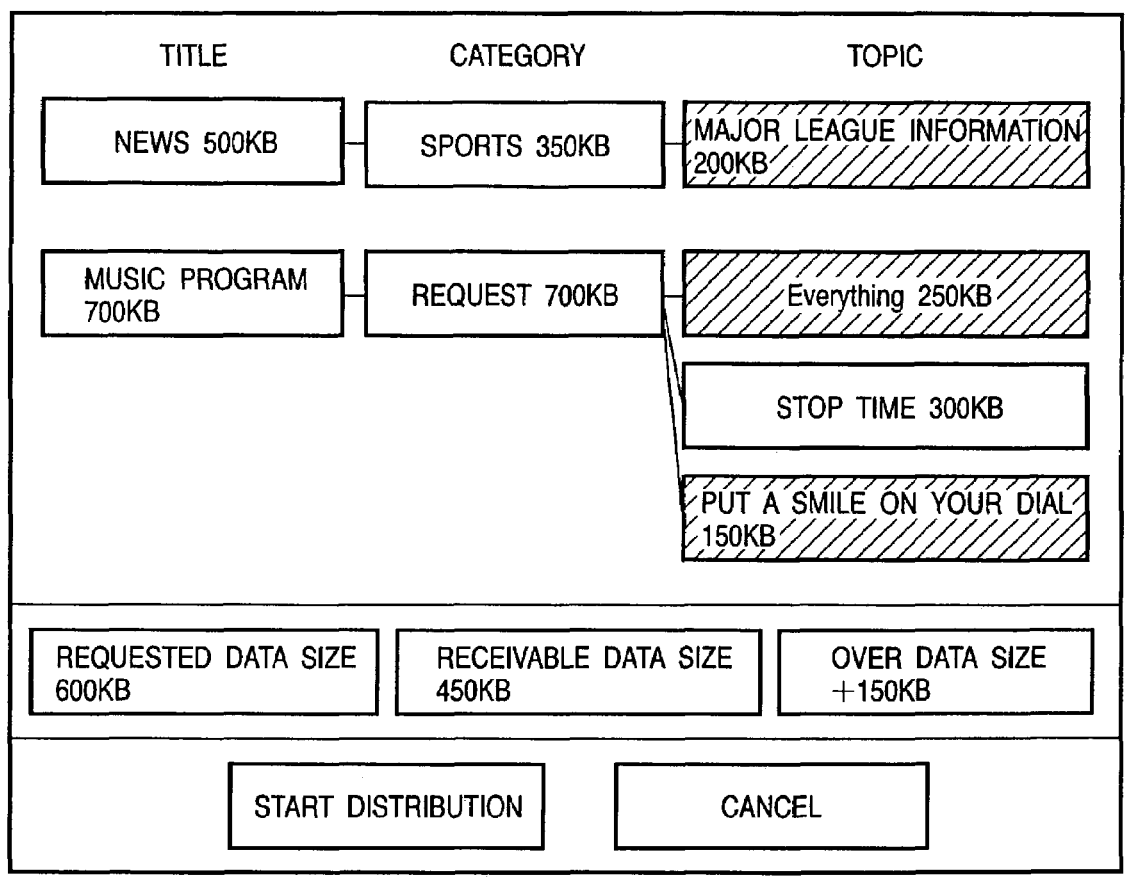
FIG. 15 illustrates an example of a user interface based on a summary scheme IV according to the fourth embodiment of the present invention.

In the example shown in FIG. 13, according to summary scheme II, all titles, categories and topics are displayed and the user arbitrarily selects contents to be distributed from among them, but if the user likes sports and music and dislikes a political topic, the summary scheme III automatically and internally selects a title, category and topic about sports and music as shown in FIG. 15 and automatically creates a summary distribution list from them.

At this time, topics and categories of the user's preferences are assigned priority order and entries are made in the summary distribution list in this priority order. For the last entry of topic or category, a topic or category that falls within the receivable data size is given higher priority among the topics and categories of the same priority order.

MPEG-7 under study by the ISO international standard defines a data structure describing user preferences or a data structure for sending a summary for each point of view and if information on these user preferences and the summary is described for the moving images to be distributed, this information is collated with prestored information on user preferences and it is possible to further create a summary that falls within the receivable data size with the battery duration using preferential information of user preferences.

Summary Scheme IV

Information on user preferences is prestored, a title, category and topic of preferences are displayed based on this information, the user selects desired items from the displayed category and topic. A relationship between the total data size and receivable data size according to the remaining power of the battery is displayed. An alarm is issued on a display or with a sound or sound message or a combination thereof when the total data size exceeds the receivable data size so that the user can select items within the receivable data size to create a summary.

Figure 16:
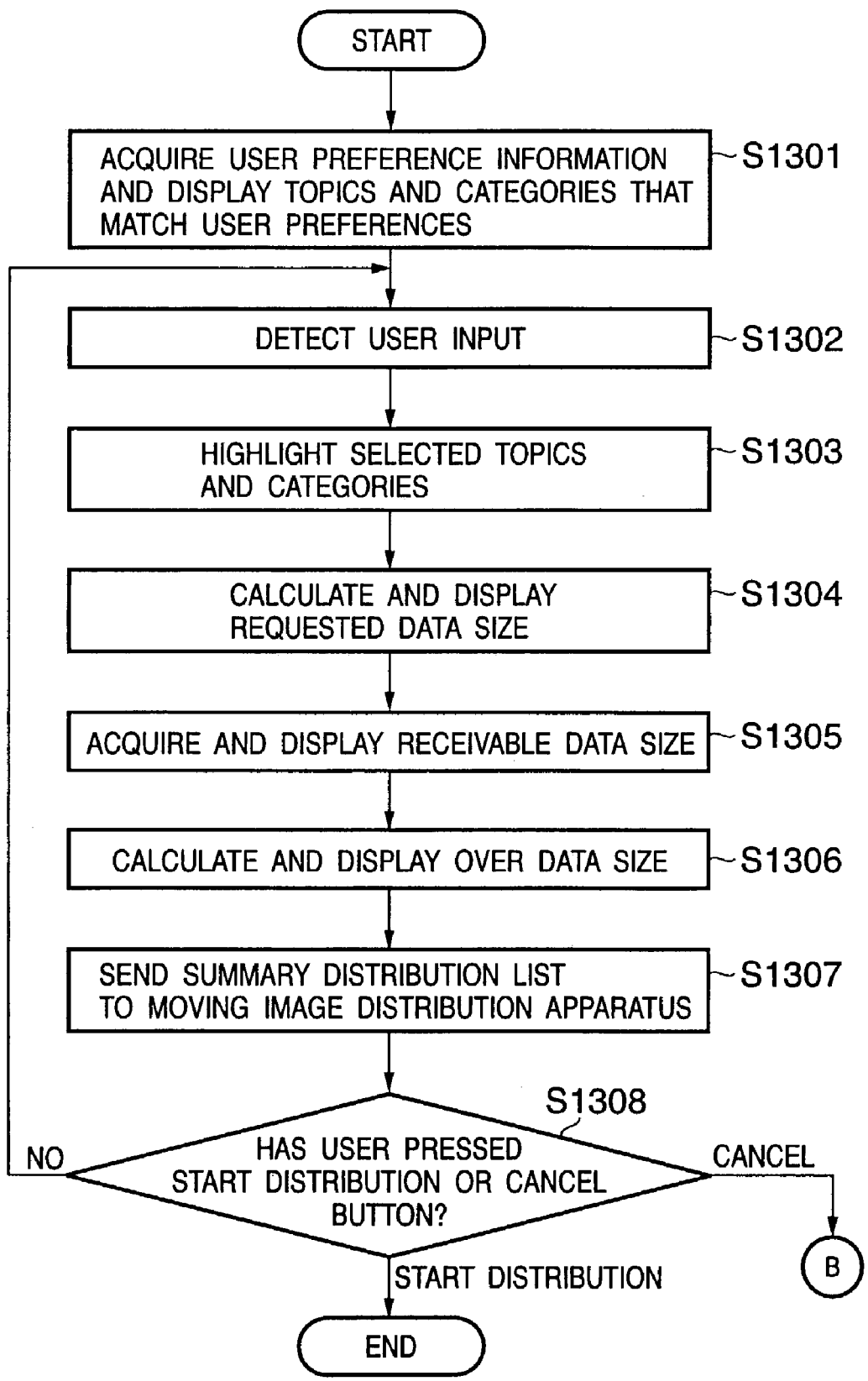
FIG. 16 is a flow chart showing the summary distribution list creation process based on the summary scheme IV according to the fourth embodiment of the present invention.

FIG. 16 shows a flow chart of a summary distribution list creation process carried out when the summary scheme IV is selected in step S913 in FIG. 12.

The example shown in FIG. 13 according to the summary scheme II displays all titles, categories and topics, but if the user likes sports and music and dislikes a political topic, for example, the summary scheme IV only displays a category and topic about sports and music as shown in FIG. 15 in step S1301. The distribution data sizes of all topics in the category are displayed next to the category name and the distribution data size of each topic is displayed next to the topic name. The information shown in FIG. 15 is supplied to the UI control section 805 by the distribution control section 806 in response to the selection of the summary scheme IV at the moving image reception apparatus 200.

In step S1302, the content selected by the user is detected. When a topic is selected, the topic is detected and when a category is selected, it is decided that all topics in the category are selected and when a title is selected, it is decided that all categories and all topics in the title are selected. Here, when the user selects a title, category or topic which has not been selected yet, it is decided that the title, category or topic is "selected (to be registered in a summary distribution list)" and when the user selects a title, category or topic which has already been selected, it is decided that the title, category or topic is "deselected (to be removed from the summary distribution list)."

In step S1303, the title, category or topic selected by the user is highlighted (highlighting is canceled in the case of deselection) and at the same time, it is registered in the summary distribution list (to be removed from the list in the case of deselection). In step S1304, the requested data size which is a total data size of the currently selected title, category and/or topic is calculated and displayed. In step S1305, the receivable data size is acquired according to the remaining power of the battery and displayed. In step S1306, the requested data size is compared with the receivable data size and the comparison result is displayed.

More specifically, when the requested data size exceeds the receivable data size, the data size by which the requested data size exceeds the receivable data size, that is, the over data size is calculated and displayed in positive, while the requested data size does not exceed the receivable data size, the over data size is displayed in negative. When the requested data size exceeds the receivable data size, it is also possible to issue an alarm by blinking the display, issuing a sound or sound message or using a combination thereof, etc. This over data size display allows the user to delete a topic or category exceeding this over data size from the selection list or specify a category or topic that falls within the remaining receivable data size and thereby easily accommodate the summary within the receivable data size to the full.

Since the display remains ON during a selection, the battery power is consumed and the remaining power of the battery reduces. The power consumed by the display is relatively large in the moving image reception apparatus 200, and therefore the power corresponding to the lapse of time during the selection must be reflected in the requested data size.

However, in order to avoid putting pressure on the user during the selection, it is also possible to secure the time normally required to create a summary distribution list beforehand, subtract the data size corresponding to the power consumption from the receivable data size, carry out summary distribution without reducing the receivable data size if the summary distribution list can be created within the secured time, or subtract the receivable data size and update and display it if the summary distribution list cannot be created within the time.

Then, in step S1307, the created summary distribution list is sent to the moving image distribution apparatus 300. In step S1308 when the start distribution button is pressed, the process moves on to processes in and after step S915 and when the cancel button is pressed, the created summary distribution list is canceled and the process moves back to step S913 in FIG. 12. If none of these buttons is pressed, the process moves back to step S1302 and repeats the above-described processing.

It is often the case that the receivable data size is exceeded whichever topic is selected as the last topic of the summary distribution list, and the selected distribution data does not fit to the receivable data size. In such a case, the topic that does not fall within the receivable data size may be removed from the summary distribution list, but some users may want to receive the summary until the battery is exhausted. In such a case, the system may be configured such that distribution is carried out without reducing the data size according to the summary distribution list by pressing the start distribution button even when the over data size is positive.

As described above, when the distribution data size of the specified data is greater than the receivable data size with the current remaining power of the battery, the user can specify the data to be distributed in such a way that the remaining power of the battery is enough to do so based on this alarm and in consideration of the remaining power of the battery.

Next, the re-creation of a summary distribution list in step S918 will be explained. The re-creation of a summary distribution list carried out in step S918 differs in process depending on the summary scheme selected in step S913.

As in the cases of the summary schemes I and III, in which a summary is created automatically, the user does not clearly grasp what the content of the summary will be like, and therefore no alarm is issued and the summary is handled by the moving image distribution apparatus 300 stopping the distribution as appropriate. In the case of the summary scheme III, for example, it is also possible to delete topics registered in the summary distribution list from the last topic one by one until the summary falls within the receivable data size.

Figure 17:
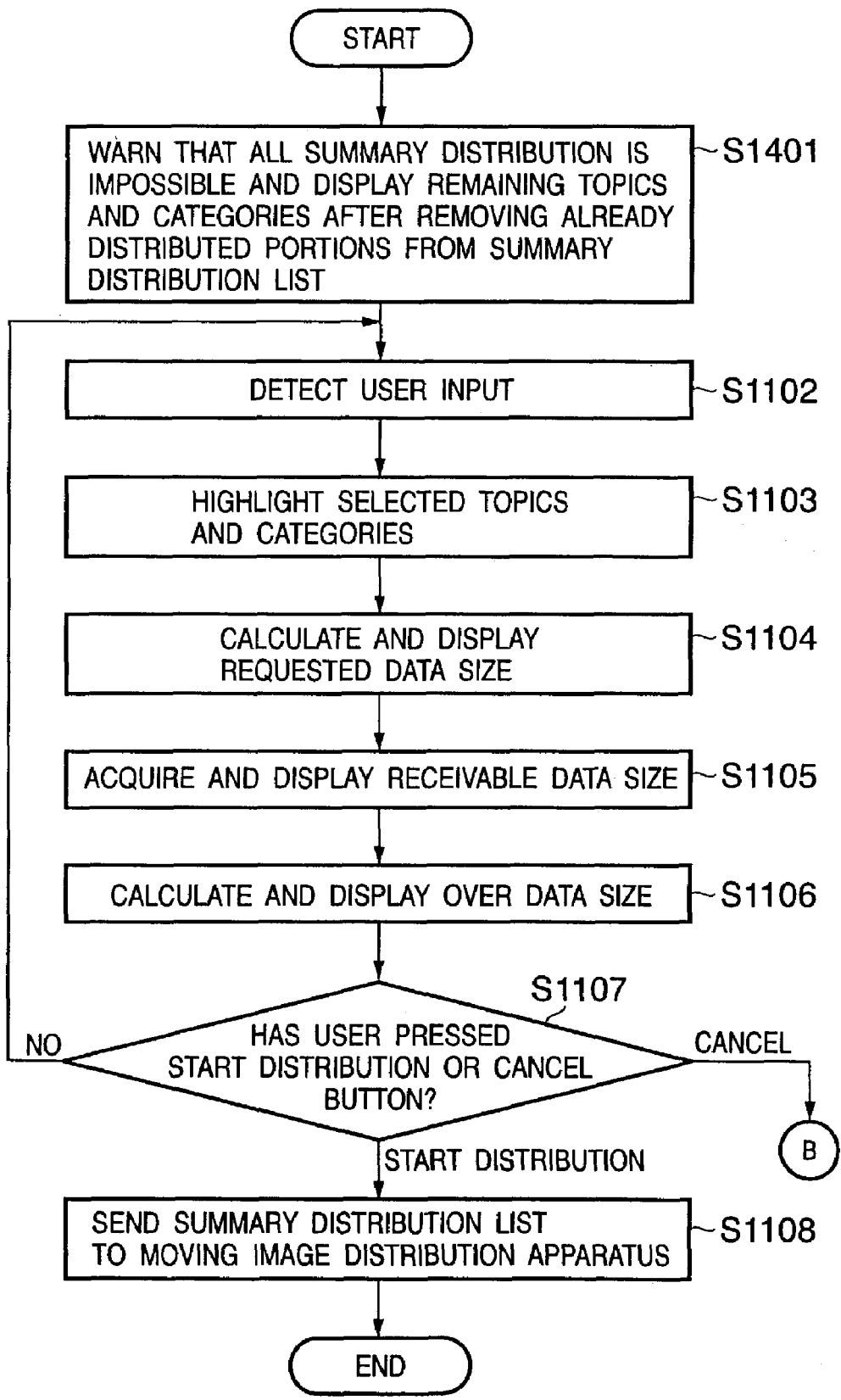
FIG. 17 is a flow chart showing a summary distribution list re-creation process based on the summary scheme II according to the fourth embodiment of the present invention.

As in the case of the summary schemes II and IV, when the user specifies the summary content, an alarm is issued on a display or with a sound or sound message or a combination thereof to indicate in step S1401 in FIG. 17 that it is not possible to receive all the specified summary data and the remaining topics and categories except the data sections received so far are displayed according to the procedures shown in FIG. 13 and FIG. 15.

The processes in steps S1102 to S1108 are the same as the operations explained with reference to FIG. 14, and therefore explanations thereof are omitted here.

As described above, according to the fourth embodiment of the present invention, data can be distributed efficiently even if the remaining power of the battery of the battery-driven data reproduction apparatus reduces.

The above-described fourth embodiment has described the case where when the remaining power of the battery is not enough during reception in step S917, a summary distribution list is created in step S918 using the summary scheme specified in step S913. However, it is also possible to configure the system so that the summary distribution list is reedited using a summary scheme different from the summary scheme specified in step S913.

Further, the above-described fourth embodiment has described the method of controlling the distribution when the remaining power of the battery is not enough on the moving image reception apparatus 200 side. This is because while the remaining power of the battery is only known on the terminal side, the intensity of radio wave can be known by either the moving image reception apparatus 200 or moving image distribution apparatus 300. Power consumption per unit time of the moving image reception apparatus 200 is not known on the distribution side, either.

However, it is also possible to allow the moving image reception apparatus 200 to sum up power consumption of elements related to communication processing considering communication radio wave and power consumed by all powered elements such as a display element to calculate total power consumption or simply sum up rated power consumption of all powered elements to calculate total power consumption and send terminal profile information including the remaining power of the battery and total power consumption, etc., to the moving image distribution apparatus 300 as appropriate so that the moving image distribution apparatus 300 controls distribution considering the remaining power of the battery.

With regard to the total power consumption, it is possible to simply use rated power consumption of the moving image reception apparatus 200 instead of power consumption in the above-described actual environment.

Furthermore, the third and fourth embodiments have shown the data structure as a hierarchical structure of categories and topics, but it is naturally possible to adopt a hierarchical structure of folders and files such as file control by an OS. This is because a normal folder has some kind of function of organizing files included therein.

Furthermore, the above-described third and fourth embodiments have described the processes of periodically judging whether the remaining power of the battery is enough or not at the time point at which transmission/distribution data is designated, and during distribution of the transmission/distribution data or a summary distribution list and generates a summary when the remaining power of the battery is judged to be insufficient, but it is also possible to decide whether the remaining power of the battery is enough or not at either timing.

Furthermore, it is also possible to only issue an alarm that the remaining power of the battery is not enough as a result of the judgment. Or it is also possible to display only the total transmission/distribution data size and transmittable/receivable data size.

Furthermore, the embodiments have described the case where the data size by which the total transmission/distribution data size exceeds the transmittable/receivable data size is warned and displayed, and the user deletes topics or categories whose total transmission/receivable data size exceeds the transmittable/receivable data size from a selection list to simply accommodate the summary within the transmittable/receivable data size, but it is also possible to adopt a configuration that the data size by which the total transmission/distribution data size falls below the transmittable/receivable data size is warned and displayed so that topics and categories that fall within the data size are selected.

[Modification of Third Embodiment]

The third embodiment can be modified to predict a transmittable time in consideration of remaining power of a battery. In such case, "data size" in the description of the third embodiment only needs to be changed to "time".

[Modification of Fourth Embodiment]

The fourth embodiment can be modified to predict a transmittable time in consideration of remaining power of a battery. In such case, "data size" in the description of the fourth embodiment only needs to be changed to "time".

Other Embodiment

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIG. 2 or 3, or FIGS. 5, 7, 9, and 10 or FIGS. 12, 14, 16 and 17 described in the embodiments.

The present invention is not limited to the above embodiments and various changes and modifications can be made within the spirit and scope of the present invention. Therefore to apprise the public of the scope of the present invention, the following claims are made.

What is claimed is:

1. A reproduction apparatus, comprising:
a communication unit adapted to receive digital data distributed by a distribution apparatus;
a reproduction unit adapted to reproduce the digital data received by the communication unit;
a prediction unit adapted to predict a reproducible time using remaining power of a battery before the reproduction apparatus requests the distribution apparatus to distribute the digital data; and
a determination unit adapted to determine whether the digital data can be reproduced to the end or not based on the reproducible time predicted by the prediction unit,
wherein if the determination unit determines that the digital data can be reproduced to the end, the reproduction apparatus requests the distribution apparatus to distribute the digital data to be reproduced by the reproduction unit, and
wherein if the determination unit determines that the digital data cannot be reproduced to the end, the reproduction apparatus issues an alarm indicating that the digital data cannot be reproduced to the end.

2. The reproduction apparatus according to claim 1, wherein if the determination unit determines that the digital data cannot be reproduced to the end, the reproduction apparatus requests the distribution apparatus to distribute summary data which is a summary of the digital data.

3. The reproduction apparatus according to claim 1, wherein the digital data includes at least one of video data and audio data.

4. A method for controlling a reproduction apparatus which includes a communication unit adapted to receive digital data distributed by a distribution apparatus and a reproduction unit adapted to reproduce the digital data received by the communication unit, the method comprising:
predicting a reproducible time using remaining power of a battery before the reproduction apparatus requests the distribution apparatus to distribute the digital data;
determining whether the digital data can be reproduced to the end or not based on the reproducible time predicted in the predicting step;
requesting the distribution apparatus to distribute the digital data to be reproduced by the reproduction unit if it is determined in the determining step that the digital data can be reproduced to the end; and
issuing an alarm indicating that the digital data cannot be reproduced to the end if it is determined in the determining step that the digital data cannot be reproduced to the end.

5. The control method according to claim 4, further comprising requesting the distribution apparatus to distribute summary data which is a summary of the digital data if it is determined in the determining step that the digital data cannot be reproduced to the end.

6. The method according to claim 4, wherein the digital data includes at least video data and audio data.

7. A storage medium storing program codes, wherein the program codes provide the method according to claim 4.

8. The storage medium according to claim 7, wherein the digital data includes at least video data and audio data.

9. A storage medium storing program codes, wherein the program codes provide the method according to claim 5.

* * * * *